US011101737B2

(12) United States Patent
Sun et al.

(10) Patent No.: US 11,101,737 B2
(45) Date of Patent: Aug. 24, 2021

(54) ON-BOARD CHARGING/DISCHARGING SYSTEM AND CONTROL METHOD THEREOF

(71) Applicant: Delta Electronics (Shanghai) Co., Ltd., Shanghai (CN)

(72) Inventors: Hao Sun, Shanghai (CN); Minli Jia, Shanghai (CN); Jinfa Zhang, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 168 days.

(21) Appl. No.: 16/666,168

(22) Filed: Oct. 28, 2019

(65) Prior Publication Data
US 2020/0212816 A1 Jul. 2, 2020

(30) Foreign Application Priority Data
Dec. 27, 2018 (CN) .......................... 201811608920.6

(51) Int. Cl.
*H02M 3/335* (2006.01)
*H02M 1/08* (2006.01)
(Continued)

(52) U.S. Cl.
CPC ......... *H02M 3/33584* (2013.01); *B60L 50/64* (2019.02); *B60L 53/22* (2019.02);
(Continued)

(58) Field of Classification Search
None
See application file for complete search history.

(56) References Cited

U.S. PATENT DOCUMENTS

2015/0180350 A1* 6/2015 Huang .............. H02M 3/33507
307/66
2017/0320396 A1 11/2017 Kim et al.
(Continued)

FOREIGN PATENT DOCUMENTS

CN 102025182 B 10/2012
CN 103182951 A 7/2013
(Continued)

OTHER PUBLICATIONS

Yun-Sung Kim et al., Topology and Control Scheme of OBC-LDC Integrated Power Unit for Electric Vehicles, IEEE Transactions on Power Electronics, vol. 32, No. 3, Mar. 2017.
(Continued)

*Primary Examiner* — Vuthe Siek
(74) *Attorney, Agent, or Firm* — Kirton McConkie; Evan R. Witt

(57) ABSTRACT

An on-board charging/discharging system includes a bidirectional converter and a low-voltage converter. When the high-voltage battery is charged or discharged by the bidirectional converter, the bidirectional converter is operated in a variable-frequency mode and the low-voltage converter is also operated in the variable-frequency mode. The on/off states of different switches are controlled according to the output gain of the bidirectional converter, and thus the on-board charging/discharging system has optimized volume and reduced cost. Moreover, the soft switching is achieved when the output gain is lower than 1, greater than 1 or equal to 1. Consequently, the efficiency of the on-board charging/discharging system is enhanced. Moreover, while the low-voltage converter is operated in a fixed-frequency mode, the first bridge of the bidirectional converter is correspondingly controlled. Consequently, the voltage of the bus capacitor is within a reasonable range.

21 Claims, 21 Drawing Sheets

(51) Int. Cl.
  *B60L 53/22*  (2019.01)
  *B60L 50/64*  (2019.01)
  *H02J 7/00*  (2006.01)

(52) U.S. Cl.
  CPC .............. *H02J 7/00* (2013.01); *H02M 1/083* (2013.01); *H02M 3/33592* (2013.01); *B60L 2210/10* (2013.01); *H02J 2207/20* (2020.01)

(56) References Cited

U.S. PATENT DOCUMENTS

| | | | |
|---|---|---|---|
| 2018/0097448 | A1 | 4/2018 | Kawakatsu |
| 2020/0212817 | A1* | 7/2020 | Sun .................. H02M 3/33584 |

FOREIGN PATENT DOCUMENTS

| | | |
|---|---|---|
| CN | 103746419 A | 4/2014 |
| CN | 103872728 A | 6/2014 |
| CN | 103907279 A | 7/2014 |
| CN | 205039570 U | 2/2016 |
| CN | 105763066 A | 7/2016 |
| CN | 106685039 A | 5/2017 |
| CN | 106936184 A | 7/2017 |
| CN | 106936319 A | 7/2017 |
| CN | 107284273 A | 10/2017 |
| CN | 107332341 A | 11/2017 |
| CN | 107623365 A | 1/2018 |
| CN | 107662498 A | 2/2018 |
| CN | 107919809 A | 4/2018 |
| CN | 207345714 U | 5/2018 |
| CN | 108237943 A | 7/2018 |
| CN | 207753492 U | 8/2018 |
| CN | 108569154 A | 9/2018 |
| CN | 108944491 A | 12/2018 |
| CN | 108964474 A | 12/2018 |
| CN | 109038736 A | 12/2018 |
| CN | 208272859 U | 12/2018 |
| JP | 2003264133 A | 9/2003 |
| JP | 2017070195 A | 4/2017 |
| JP | 2018074692 A | 5/2018 |
| KR | 20150101913 A | 9/2015 |

OTHER PUBLICATIONS

Zoran Pavlovic et al., Bidirectional Multiple port dc/dc transformer based on a series resonant converter, IEEE, 2013.

Hao Ma et al., An Integrated Design of Power Converters for Electric Vehicles, IEEE, 2017, 600-605.

Yichao Tang et all., An Integrated Dual-Output Isolated Converter for Plug-in Electric Vehicles, IEEE Transactions on Vehicular Technology, vol. 67, No. 2, Feb. 2018, 966-976.

Yun-Sung Kim et al., Topology and Control Scheme of OBC-LDC Integrated Power Unit for Electric Vehicles, IEEE Transactions on Power Electronics, vol. 32, No. 3, Mar. 2017, 1731-1743.

* cited by examiner

S10: The on-board charging/discharging system is operated in one of a first mode, a second mode, a third mode, a fourth mode and a fifth mode.

S20: In the first mode, the high-voltage battery is charged by the bidirectional converter and the low-voltage converter is disabled.
In the second mode, the high-voltage battery is charged by the bidirectional converter and the low-voltage converter is enabled.
In the third mode, the high-voltage battery is discharged by the bidirectional converter and the low-voltage converter is disabled, wherein when the output gain of the bidirectional converter is lower than 1, the upper switch and the lower switch of the first bridge arm and the upper switch and the lower switch of the second bridge arm perform the synchronous rectifying operation, wherein when the output gain of the bidirectional converter is greater than or equal to 1, the on/off states of the lower switch of the first bridge arm and the lower switch of the second bridge arm are switched at a time that the zero-crossing point of the resonant current is delayed for a phase-shift time period, and the upper switch of the first bridge arm and the upper switch of the second bridge arm perform the synchronous rectifying operation.
In the fourth mode, the high-voltage battery is discharged by the bidirectional converter and the low-voltage converter is enabled, and the operation of the bidirectional converter in the fourth mode is identical to the operation of the bidirectional converter in the third mode, wherein the timing of switching the first switch to the on state is synchronous with the timing of switching a lower switch of the third bridge arm, an upper switch of the fourth bridge arm and a first rectifying switch to the on states and is synchronous with the timing of switching an upper switch of the third bridge arm, a lower switch of the fourth bridge arm and a second rectifying switch to the on states, and the timing of switching the first switch to the off state is determined according to a demand of the low-voltage battery.
In the fifth mode, the low-voltage converter is operated, the operations of the first bridge arm and the second bridge arm make a short-circuit between a neutral-point of the first bridge arm and a neutral-point of the second bridge arm, and switching frequencies of the third bridge arm and the fourth bridge arm are greater than a resonant frequency of the resonant circuit.

FIG. 21

ON-BOARD CHARGING/DISCHARGING SYSTEM AND CONTROL METHOD THEREOF

FIELD OF THE INVENTION

The present disclosure relates to a field of an electric vehicle, and more particularly to an on-board charging/discharging system and a control method thereof.

BACKGROUND OF THE INVENTION

At present, on-board charger and dc-dc converter are two necessary components employed in an electric vehicle. The on-board charger is used to charge a high-voltage battery. The dc-dc converter is used to convert the high voltage from the high-voltage battery into the low voltage (e.g., 12V) so as to provide required power to an electric power assistant steering system, a control system, a lighting system, a video and audio system, a transducer in the electric vehicle and so on. With the enhancement in user experience, conventional unidirectional charger will be replaced gradually by a bidirectional charger with discharging function in the future.

The bidirectional charger has following features. The bidirectional charger can not only charge the high-voltage battery but also discharge the high-voltage battery. The bidirectional charger converts electric energy from the high-voltage battery into AC power and provides the AC power to a household appliance, other vehicle or a grid-connected power source, so that an optimal energy configuration can be realized. However, the bidirectional charger and the dc-dc converter not only occupy space but also increase cost if they are superimposed on the volume. Therefore, it is necessary to integrate the bidirectional charger and the dc-dc converter in circuit topology and control by sharing switching devices and magnetic components so as to reduce volume, reduce cost and increase power density. To address the aforementioned issues, a three-port circuitry topology is proposed. The three-port circuit topology has function of bidirectional operations, is symmetry in device configuration and magnetic circuit design, and has some circuits and magnetic circuits shared. Consequently, the functions, which are the same with that of superimposing two separate components, can be achieved through an effective control strategy, and the volume and cost are optimized.

Generally, the electric vehicle includes a bidirectional on-board charging/discharging system. The bidirectional on-board charging/discharging system is used for converting the AC input electric energy to regulated voltages. The regulated voltages are provided to the high-voltage battery and the dc-dc converter in the electric vehicle. The bidirectional on-board charging/discharging system is also able to discharge the high-voltage battery to an AC voltage. Consequently, the purpose of providing emergency power and the purpose of the grid-connected power generation can be realized. According to the power supply requirements of the high-voltage battery and the low-voltage battery, the conventional bidirectional on-board charging/discharging system usually uses a magnetic integration technology to form the three-port circuitry topology. In other words, the bidirectional on-board charging/discharging system includes three ports that share a magnetic component. The first port is electrically connected with an external device. The second port is electrically connected with the high-voltage battery. The third port is electrically connected with the low-voltage battery.

A lot of research on the control of the three-port circuitry topology has been published. FIG. 1 is a schematic circuit diagram illustrating a conventional three-port circuitry topology, which is described in Yun-Sung Kim, Chang-Yeol Oh, Won-Yong Sung, Byoung Kuk Lee "Topology and Control Scheme of OBC-LDC Integrated Power Unit for Electric Vehicles". IEEE Transactions on Power Electronic, volume 32, Issues 3, pp. 1731 to 1743, March, 2017. As shown in FIG. 1, the high-voltage dc-dc part uses fixed-frequency phase-shift control method and generally employs a dual active bridge (DAB) circuit, so that the soft switching range thereof is narrow and the efficiency is not optimized.

FIG. 2 is a schematic circuit diagram illustrating another conventional three-port circuitry topology, which is described in Hao Ma, Yuan Tan, Li Du, Xu Han, Jing Ji "An integrated design of power converters for electric vehicles". IEEE 26th International Symposium on Industrial Electronics (ISIE), pp. 600 to 605, 2017. As shown in FIG. 2, a PWM plus shift control is added to provide expending soft switching range. The power converter uses dual active bridge control method to expend the soft switching range by controlling three full-bridge circuits harmoniously. However, the full-bridge topology with low-voltage output has no advantage at high current output applications and is only suitable for low-power output applications, so that the practical range for the electric vehicle application is limited.

FIG. 3 is a schematic circuit diagram illustrating a conventional bidirectional three-port CLLC resonant converter, which is described in Yichao Tang, Jiangheng Lu, Bin Wu, Shenli Zou, Weisheng Ding, Alireza Khaligh "An Integrated Dual-Output Isolated Converter for Plug-in Electric Vehicles", IEEE Transactions on Vehicular Technology, Volume 67, Issues 2, pp. 966 to 976, February 2018. As shown in FIG. 3, a bidirectional three-port CLLC resonant converter is proposed to enhance the efficiency. The bidirectional three-port CLLC resonant converter has following features. A high-voltage dc-to-dc charging part of the bidirectional three-port CLLC resonant converter ensures that the resonant converter operates near quasi-resonance by controlling the input bus voltage so as to enhance the efficiency. When the low-voltage dc-to-dc converter operates, the low-voltage dc-to-dc converter can be served as a LLC circuit to ensure the soft switching operations of the devices. However, the bidirectional three-port CLLC resonant converter has wide high-voltage input regulating range and has strict requirements for device selection, so that the cost increases. In addition, as the LLC circuit is used to provide wide low-voltage output, the voltage regulating range is limited by the bus voltage so that the practical application of this scheme is also limited.

As known, the three-port circuitry topology of the conventional bidirectional on-board charging/discharging system is helpful to optimize the volume and reduce the cost. Since the conventional bidirectional on-board charging/discharging system uses a fixed-frequency control method, the control method is simple. However, the control method still has some drawbacks. For example, fixed-frequency control method can achieves soft switching when the output gain is close to 1 and achieves hard switching when the output gain is not close to 1. Since the soft switching range of the conventional bidirectional on-board charging/discharging system is narrow, the efficiency is not satisfied.

SUMMARY OF THE INVENTION

An object of the present disclosure provides an on-board charging/discharging system and a control method thereof so as to address the above-mentioned issues encountered by the prior arts.

Another object of the present disclosure provides an on-board charging/discharging system and a control method thereof. The soft switching is achieved when the output gain is lower than 1, greater than 1 or equal to 1. Since the soft switching range of the on-board charging/discharging system of the present disclosure is widened, the efficiency of the on-board charging/discharging system is enhanced.

A further object of the present disclosure provides an on-board charging/discharging system and a control method thereof. Moreover, while a low-voltage converter of the on-board charging/discharging system is operated in a fixed-frequency mode or a variable-frequency mode, the bidirectional converter is correspondingly controlled. In such way, the electric energy from the resonant circuit will not continuously charge the bus capacitor. Consequently, the voltage of the bus capacitor can be controlled to be within a reasonable range In accordance with an aspect of the present disclosure, an on-board charging/discharging system is provided. The on-board charging/discharging system includes a bidirectional converter and a low-voltage converter. The bidirectional converter is electrically connected between a bus capacitor and a high-voltage battery and configured to charge or discharge the high-voltage battery. The bidirectional converter includes a first bridge circuit, a resonant circuit, a transformer and a second bridge circuit. The first bridge circuit includes a first bridge arm and a second bridge arm. The resonant circuit is electrically connected with the first bridge circuit. The transformer includes a first winding assembly and a second winding assembly. The first winding assembly is electrically connected with the resonant circuit. The first winding assembly and the second winding assembly magnetically interact with each other. The second bridge circuit is electrically connected with the second winding assembly through a first capacitor, and is electrically connected with the high-voltage battery. The second bridge circuit includes a third bridge arm and a fourth bridge arm. The low-voltage converter is electrically connected with a low-voltage battery. During operation of the low-voltage converter, the received electric energy is converted into a regulated voltage to power the low-voltage battery. The low-voltage converter includes a third winding assembly with a center tap, a synchronous rectifying circuit and a power switching circuit. The third winding assembly magnetically interfaces with the first winding assembly and the second winding assembly. The synchronous rectifying circuit includes a first rectifying switch electrically connected with a first terminal of the third winding assembly and a second rectifying switch electrically connected with a second terminal of the third winding assembly. The power switching circuit is electrically connected between the center tap of the third winding assembly and the low-voltage battery. The power switching circuit includes a first switch and a second switch. The first switch is electrically connected between the center tap of the third winding assembly and the low-voltage battery. The second switch is electrically connected with the first switch and the synchronous rectifying circuit. The on/off states of the first switch and the second switch are complementary. The on-board charging/discharging system is operated in one of a first mode, a second mode, a third mode, a fourth mode and a fifth mode. When the on-board charging/discharging system is operated in the first mode, the high-voltage battery is charged by the bidirectional converter and the low-voltage converter is disabled. When the on-board charging/discharging system is operated in the second mode, the high-voltage battery is charged by the bidirectional converter and the low-voltage converter is enabled. When the on-board charging/discharging system is operated in the third mode, the high-voltage battery is discharged by the bidirectional converter and the low-voltage converter is disabled. When the on-board charging/discharging system is operated in the third mode and an output gain of the bidirectional converter is lower than 1, an upper switch and a lower switch of the first bridge arm and an upper switch and a lower switch of the second bridge arm perform a synchronous rectifying operation. When the on-board charging/discharging system is operated in the third mode and the output gain of the bidirectional converter is greater than or equal to 1, the on/off states of the lower switch of the first bridge arm and the lower switch of the second bridge arm are switched at a time that a zero-crossing point of a resonant current flowing through the resonant circuit is delayed for a phase-shift time period, and the upper switch of the first bridge arm and the upper switch of the second bridge arm perform the synchronous rectifying operation. When the on-board charging/discharging system is operated in the fourth mode, the high-voltage battery is discharged by the bidirectional converter and the low-voltage converter is enabled. When the on-board charging/discharging system is in the fourth mode and the output gain of the bidirectional converter is lower than 1, the upper switch and the lower switch of the first bridge arm and the upper switch and the lower switch of the second bridge arm perform the synchronous rectifying operation. When the on-board charging/discharging system is in the fourth mode and the output gain of the bidirectional converter is greater than or equal to 1, the on/off states of the lower switch of the first bridge arm and the lower switch of the second bridge arm are switched at a time that the zero-crossing point of the resonant current flowing through the resonant circuit is delayed for the phase-shift time period, and the upper switch of the first bridge arm and the upper switch of the second bridge arm perform the synchronous rectifying operation. When the on-board charging/discharging system is in the fourth mode, the timing of switching the first switch to the on state is synchronous with the timing of switching a lower switch of the third bridge arm, an upper switch of the fourth bridge arm and the first rectifying switch to the on states and is synchronous with the timing of switching an upper switch of the third bridge arm, a lower switch of the fourth bridge arm and the second rectifying switch to the on states, and the timing of switching the first switch to the off state is determined according to a demand of the low-voltage battery. When the on-board charging/discharging system is operated in the fifth mode, the low-voltage converter is operated, and the operations of the first bridge arm and the second bridge arm make a short-circuit between a neutral-point of the first bridge arm and a neutral-point of the second bridge arm, and the switching frequencies of the third bridge arm and the fourth bridge arm are greater than a resonant frequency of the resonant circuit.

In accordance with another aspect of the present disclosure, a control method for an on-board charging/discharging system is provided. The on-board charging/discharging system is operated in one of a first mode, a second mode, a third mode, a fourth mode and a fifth mode. When the on-board charging/discharging system is operated in the first mode, the high-voltage battery is charged by the bidirectional converter and the low-voltage converter is disabled. When the on-board charging/discharging system is operated in the second mode, the high-voltage battery is charged by the bidirectional converter and the low-voltage converter is enabled. When the on-board charging/discharging system is operated in the third mode, the high-voltage battery is discharged by the bidirectional converter and the low-voltage converter is disabled. When the on-board charging/discharging system is operated in the third mode and an output gain of the bidirectional converter is lower than 1, an upper switch and a lower switch of the first bridge arm and an upper switch and a lower switch of the second bridge arm perform a synchronous rectifying operation. When the on-board charging/discharging system is operated in the third mode and the output gain of the bidirectional converter is greater than or equal to 1, the on/off states of the lower switch of the first bridge arm and the lower switch of the second bridge arm are switched at a time that a zero-crossing point of resonant current flowing through the resonant circuit is delayed for a phase-shift time period, and the upper switch of the first bridge arm and the upper switch of the second bridge arm perform the synchronous rectifying operation. When the on-board charging/discharging system is operated in the fourth mode, the high-voltage battery is discharged by the bidirectional converter and the low-voltage converter is enabled. When the on-board charging/discharging system is operated in the fourth mode and the output gain of the bidirectional converter is lower than 1, the upper switch and the lower switch of the first bridge arm and the upper switch and the lower switch of the second bridge arm perform the synchronous rectifying operation. When the on-board charging/discharging system is operated in the fourth mode and the output gain of the bidirectional converter is greater than or equal to 1, the on/off states of the lower switch of the first bridge arm and the lower switch of the second bridge arm are switched at a time that the zero-crossing point of resonant current flowing through the resonant circuit is delayed for the phase-shift time period, and the upper switch of the first bridge arm and the upper switch of the second bridge arm perform the synchronous rectifying operation. When the on-board charging/discharging system is operated in the fourth mode, the timing of switching a first switch to the on state is synchronous with the timing of switching a lower switch of the third bridge arm, an upper switch of the fourth bridge arm and a first rectifying switch to the on states and is synchronous with the timing of switching an upper switch of the third bridge arm, a lower switch of the fourth bridge arm and a second rectifying switch to the on states, and the timing of switching the first switch to the off state is determined according to a demand of the low-voltage battery. When the on-board charging/discharging system is in the fifth mode, the low-voltage converter is operated, and the operations of the first bridge arm and the second bridge arm make a short-circuit between a neutral-point of the first bridge arm and a neutral-point of the second bridge arm, and switching frequencies of the third bridge arm and the fourth bridge arm are greater than a resonant frequency of the resonant circuit.

The above contents of the present disclosure will become more readily apparent to those ordinarily skilled in the art after reviewing the following detailed description and accompanying drawings, in which:

BRIEF DESCRIPTION OF THE DRAWINGS

FIG. 21 is a flowchart illustrating a control method for on-board charging/discharging system of FIG. 4 according to the embodiment of the present disclosure.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
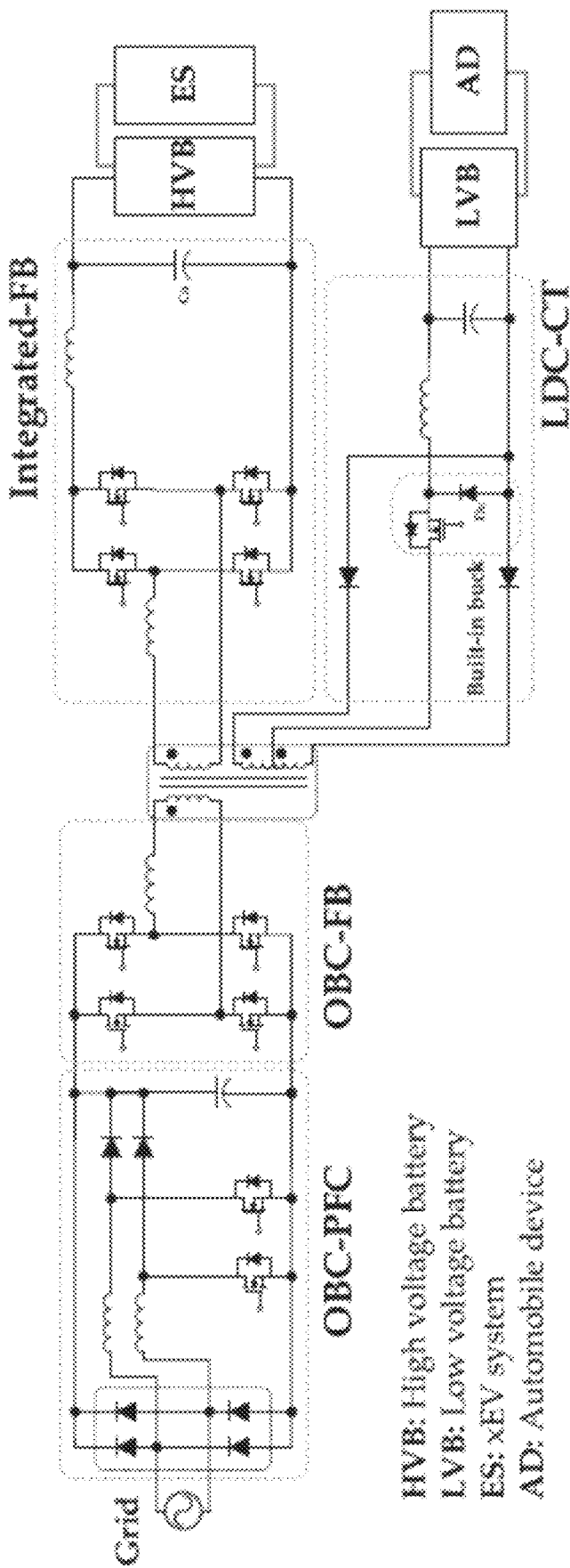
FIG. 1 is a schematic circuit diagram illustrating a conventional three-port circuitry topology.
Figure 2:
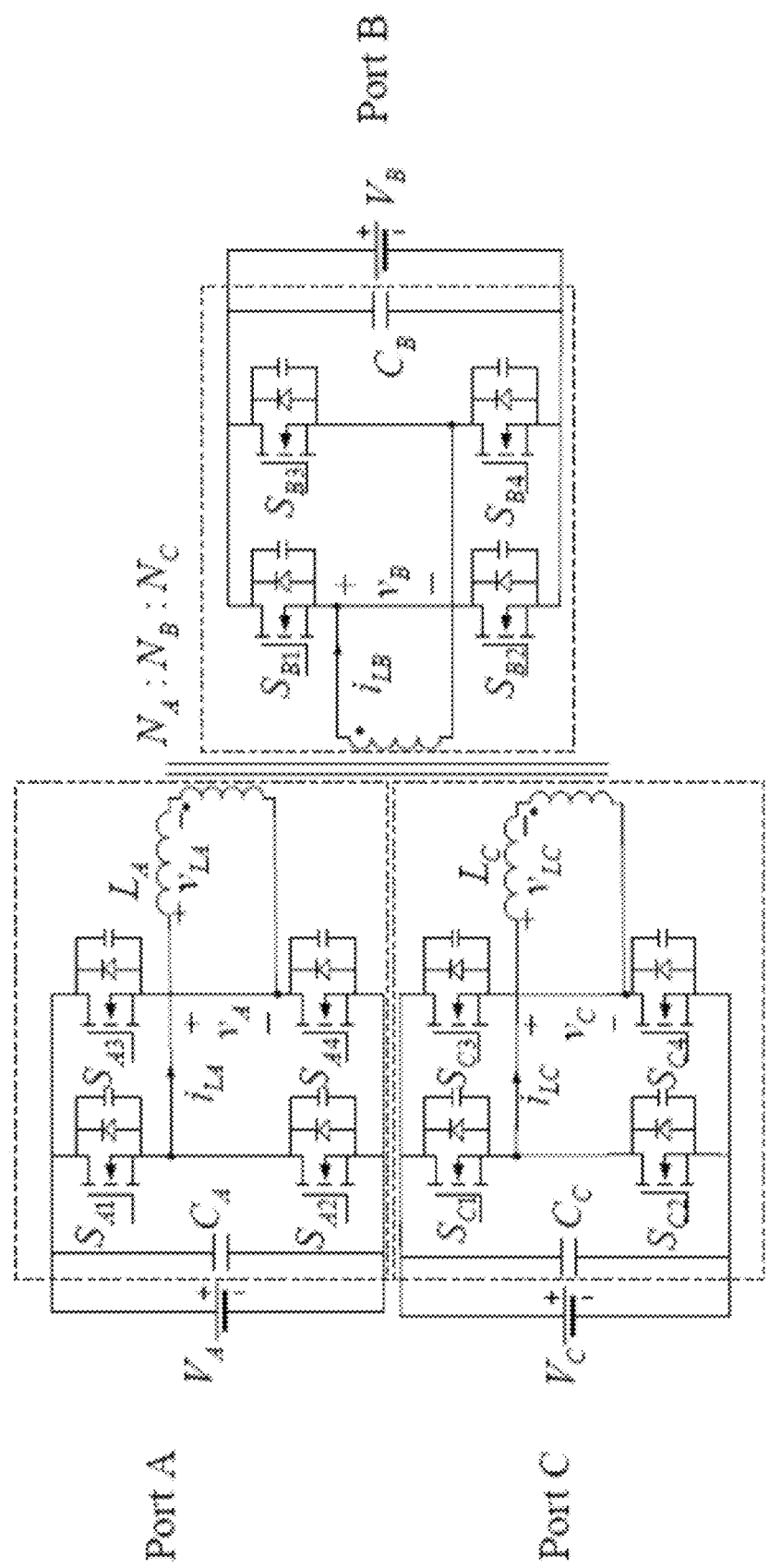
FIG. 2 is a schematic circuit diagram illustrating another conventional three-port circuitry topology.
Figure 3:
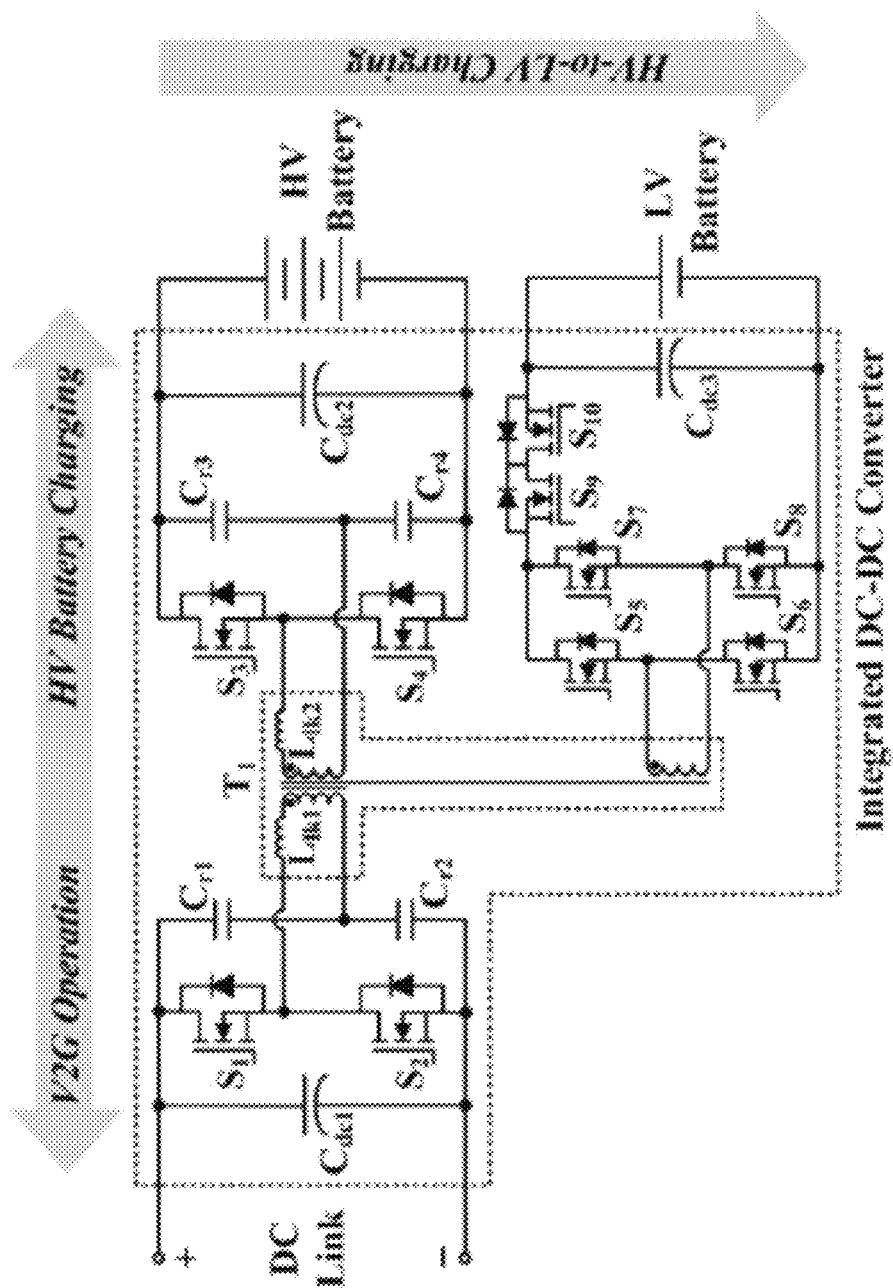
FIG. 3 is a schematic circuit diagram illustrating a conventional bidirectional three-port CLLC resonant converter.
Figure 4:
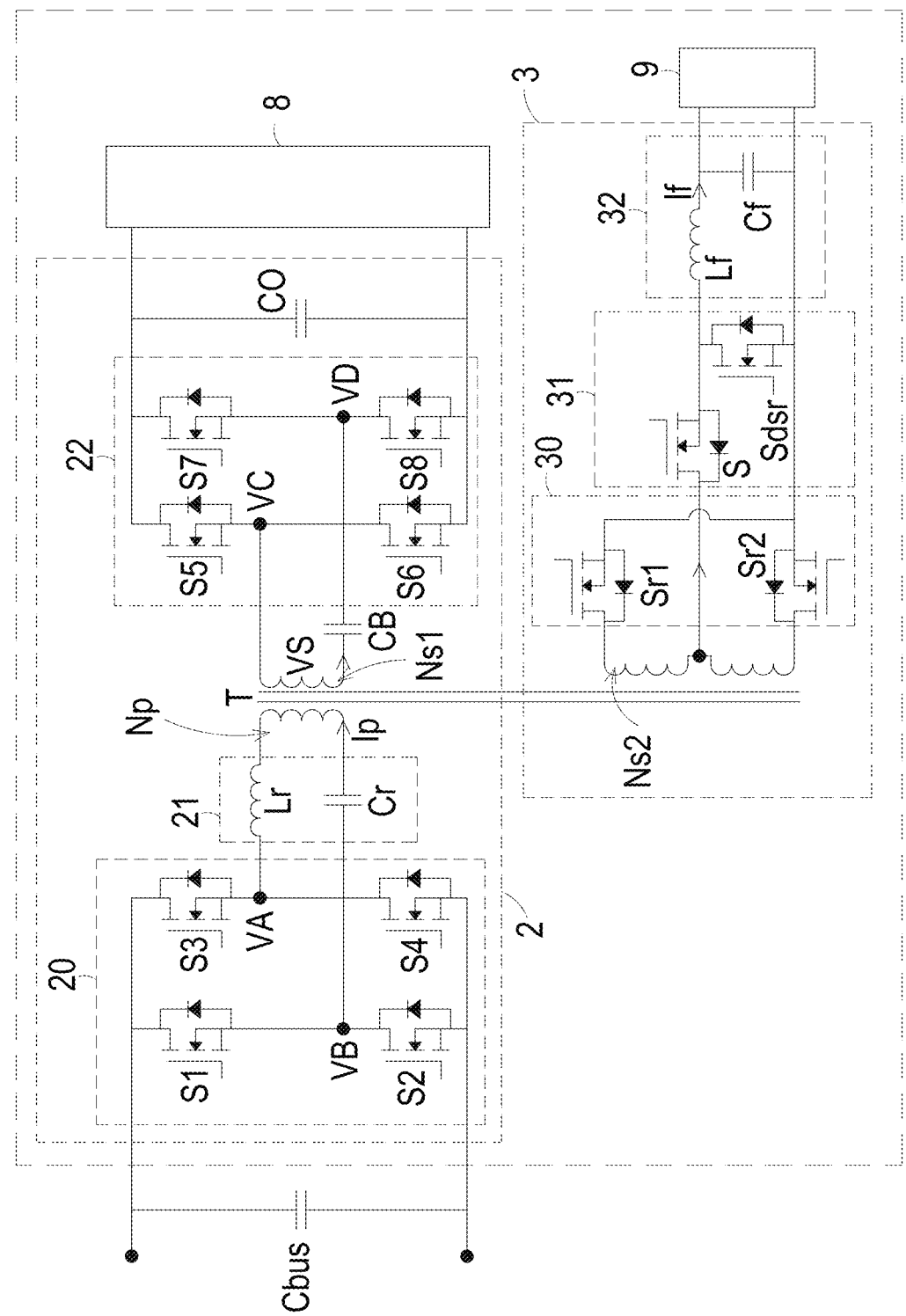
FIG. 4 is a schematic circuit diagram illustrating the architecture of an on-board charging/discharging system according to an embodiment of the present disclosure.

FIG. 4 is a schematic circuit diagram illustrating the architecture of an on-board charging/discharging system according to an embodiment of the present disclosure. As shown in FIG. 4, preferably but not exclusively, the on-board charging/discharging system 1 is applied to an electric vehicle. The on-board charging/discharging system 1 includes a high-voltage battery 8 and a low-voltage battery 9. The high-voltage battery 8 provides electric energy for driving the electric vehicle. The low-voltage battery 9 is installed within the electric vehicle and includes a plurality of electronic components that are driven by low voltages. Moreover, the on-board charging/discharging system 1 is powered by an external device (not shown). The electric energy from the external device is firstly converted into a converted voltage by a power factor correction circuit (not shown) within the electric vehicle. The converted voltage is transmitted to a bus capacitor Cbus within the electric vehicle for generating a bus voltage. After the bus voltage of the bus capacitor Cbus is converted into regulated voltages by the on-board charging/discharging system 1, the regulated voltages are provided to the high-voltage battery 8 and/or the low-voltage battery 9. Alternatively, the on-board charging/discharging system 1 is powered by the high-voltage battery 8. After the electric energy from the high-voltage battery 8 is converted by the on-board charging/discharging system 1, the converted voltage also can transmit to the external device and/or the low-voltage battery 9.

The on-board charging/discharging system 1 includes a bidirectional converter 2 and a low-voltage converter 3. Preferably, the maximum output power of the bidirectional converter 2 is 6.6 KW, and the maximum output power of the low-voltage converter 3 is 3 KW.

The bidirectional converter 2 is electrically connected between the bus capacitor Cbus and the high-voltage battery 8 and is capable of converting electric energy in two directions. During the operation of the bidirectional converter 2, the high-voltage battery 8 is selectively charged or discharged. In this embodiment, the bidirectional converter 2 further includes a first bridge circuit 20, a resonant circuit 21, a transformer T, a first capacitor CB, a second bridge circuit 22 and an output capacitor CO. A first terminal of the first bridge circuit 20 is electrically connected with the bus capacitor Cbus. The first bridge circuit 20 includes a first bridge arm and a second bridge arm. The first bridge arm includes an upper switch S1 and a lower switch S2, which are connected with each other in series. The second bridge arm includes an upper switch S3 and a lower switch S4, which are connected with each other in series. The resonant circuit 21 is electrically connected with a second terminal of the first bridge circuit 20. That is, a first terminal of the resonant circuit 21 is electrically connected with a first node between the upper switch S1 and the lower switch S2, and a second terminal of the resonant circuit 21 is electrically connected with a second node between the upper switch S3 and the lower switch S4. The second node between the upper switch S3 and the lower switch S4 has a node voltage VA. The first node between the upper switch S1 and the lower switch S2 has a node voltage VB. A resonant current Ip flows through the resonant circuit 21. The transformer T includes a first winding assembly Np and a second winding assembly Ns1. The first winding assembly Np is electrically connected with the resonant circuit 21. The first winding assembly Np and the second winding assembly Ns1 magnetically interact with each other. The second bridge circuit 22 is electrically connected to the second winding assembly Ns1 through the first capacitor CB, electrically connected to the high-voltage battery 8 and electrically connected with the output capacitor CO. The second bridge circuit 22 includes a third bridge arm and a fourth bridge arm. The third bridge arm includes an upper switch S5 and a lower switch S6, which are connected with each other in series. The fourth bridge arm includes an upper switch S7 and a lower switch S8, which are connected with each other in series. A third node between the upper switch S5 and the lower switch S6 is electrically connected with a first terminal of the second winding assembly Ns1. A fourth node between the upper switch S7 and the lower switch S8 is electrically connected with a second terminal of the second winding assembly Ns1. The third node between the upper switch S5 and the lower switch S6 has a node voltage VC. The fourth node between the upper switch S7 and the lower switch S8 has a node voltage VD. The winding voltage VS is equal to the difference between the node voltage VC and the node voltage VD. In an embodiment, the third node between the upper switch S5 and the lower switch S6 of the second bridge circuit 22 is electrically connected to the second winding assembly Ns1 through the first capacitor CB.

In an embodiment, the resonant circuit 21 includes a resonant inductor Lr and a resonant capacitor Cr. The resonant inductor Lr is electrically connected between the second node (i.e., the node between the upper switch S3 and the lower switch S4) and the first terminal of the first winding assembly Np. The resonant capacitor Cr is electrically connected between the first node (i.e., the node between the upper switch S1 and the lower switch S2) and the second terminal of the first winding assembly Np.

The low-voltage converter 3 is electrically connected with the low-voltage battery 9. During the operation of the low-voltage converter 3, the received electric energy is converted into the regulated voltage to power the low-voltage battery 9. In an embodiment, the low-voltage converter 3 includes a third winding assembly Ns2, a rectifying circuit 30 and a power switching circuit 31. The third winding assembly Ns2 includes a center tap. The third winding assembly Ns2 magnetically interfaces with the first winding assembly Np and the second winding assembly Ns1. The rectifying circuit 30 is electrically connected with the third winding assembly Ns2. The rectifying circuit 30 includes a first rectifying switch Sr1 and a second rectifying switch Sr2. The first rectifying switch Sr1 is electrically connected with a first terminal of the third winding assembly Ns2. The second rectifying switch Sr2 is electrically connected with a second terminal of the third winding assembly Ns2. The power switching circuit 31 is electrically connected between the center tap of the third winding assembly Ns2 and the low-voltage battery 9, and electrically connected with the rectifying circuit 30. The power switching circuit 31 includes a first switch S and a second switch Sdsr. The first switch S is electrically connected between the center tap of the third winding assembly Ns2 and the low-voltage battery 9. The second switch Sdsr is electrically connected with the first switch S and the rectifying circuit 30. The on/off states of the first switch S and the second switch Sdsr are complementary. In one embodiment, the rectifying circuit 30 is a synchronous rectifying circuit.

In some embodiments, the low-voltage converter 3 further includes a filtering circuit 32. The filtering circuit 32 is electrically connected between the power switching circuit 31 and the low-voltage battery 9. The filtering circuit 32 includes a filtering inductor Lf and a filtering capacitor Cf. Moreover, an inductor current If flows through the filtering inductor Lf.

The on-board charging/discharging system 1 is operated in one of five modes. In the five modes, the electric energy is transferred along the arrow directions as shown in FIGS. 5, 8, 11, 14 and 17.

Figure 5:
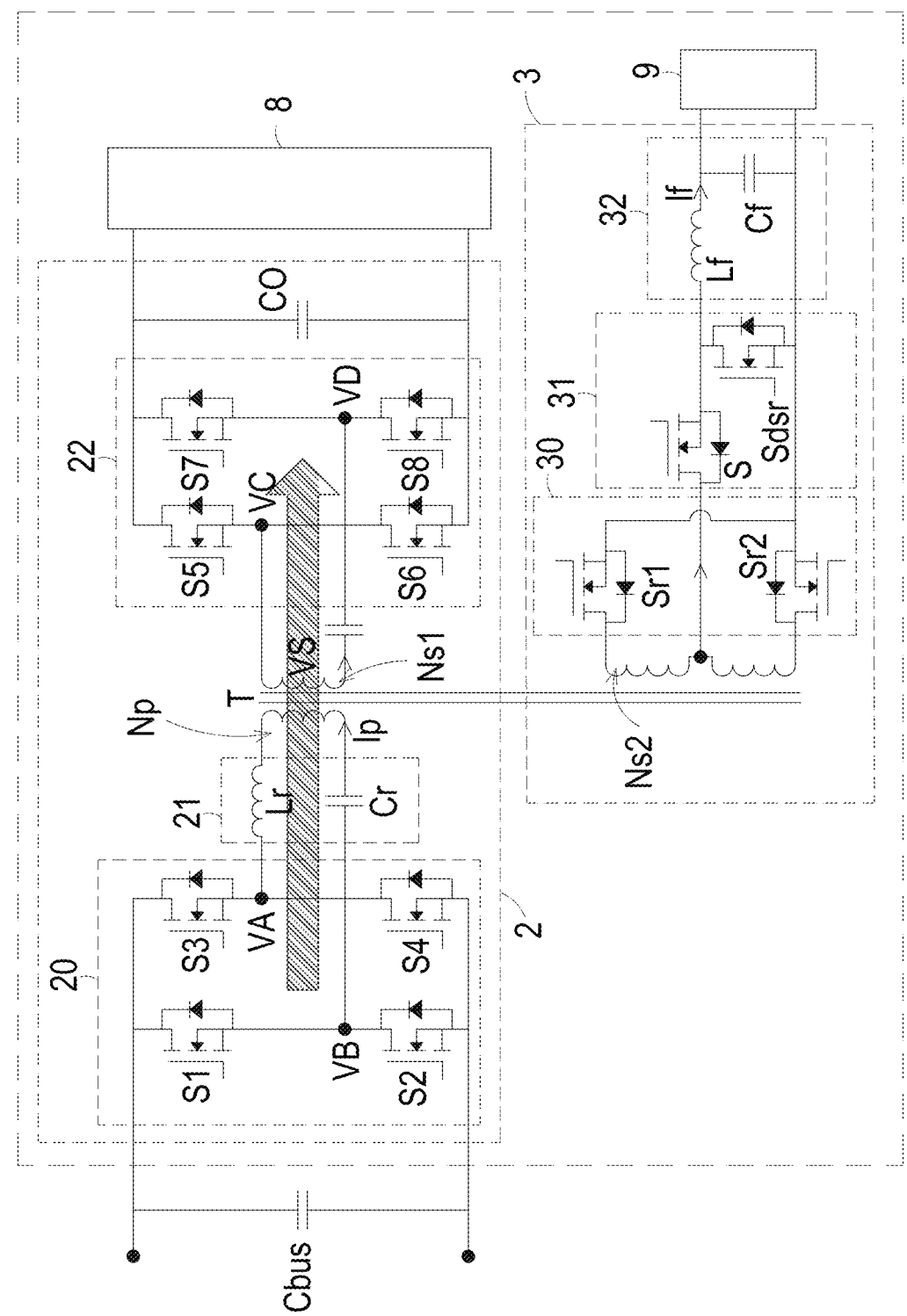
FIG. 5 is a schematic circuit diagram illustrating the path of transferring the electric energy when the on-board charging/discharging system of FIG. 4 is in a first mode.
Figure 6:
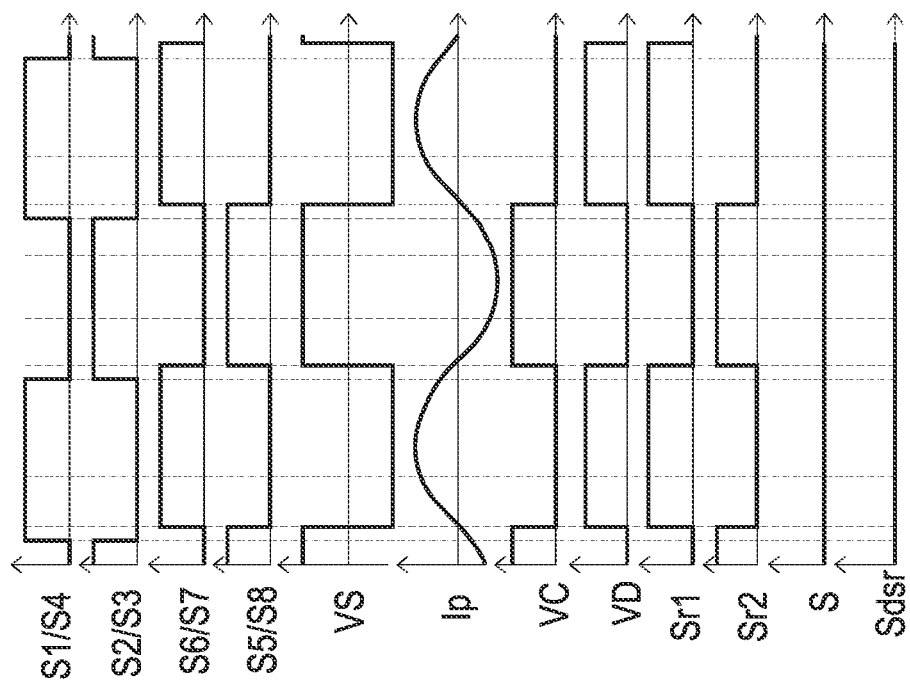
FIG. 6 is a schematic timing waveform diagram illustrating associated voltages and currents when the on-board charging/discharging system of FIG. 5 is in the first mode and the output gain of the bidirectional converter is lower than 1.
Figure 7:
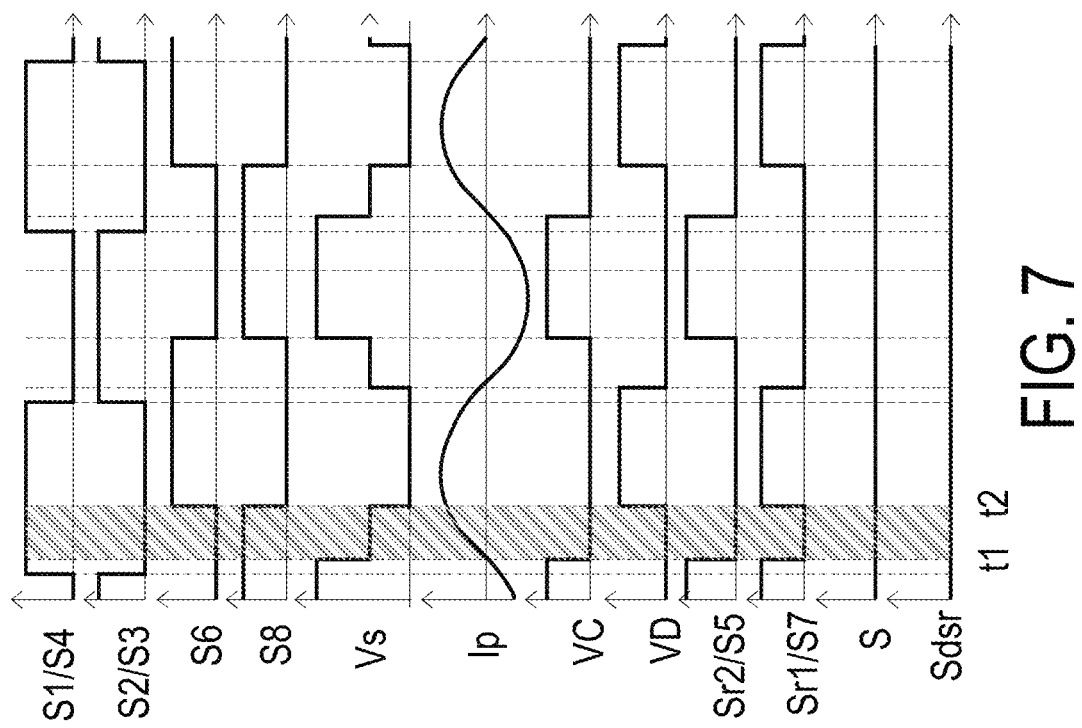
FIG. 7 is a schematic timing waveform diagram illustrating associated voltages and currents when the on-board charging/discharging system of FIG. 5 is in the first mode and the output gain of the bidirectional converter is greater than or equal to 1.

FIG. 5 is a schematic circuit diagram illustrating the path of transferring the electric energy when the on-board charging/discharging system of FIG. 4 is in a first mode. FIG. 6 is a schematic timing waveform diagram illustrating associated voltages and currents when the on-board charging/discharging system of FIG. 5 is in the first mode and the output gain of the bidirectional converter is lower than 1. FIG. 7 is a schematic timing waveform diagram illustrating associated voltages and currents when the on-board charging/discharging system of FIG. 5 is in the first mode and the output gain of the bidirectional converter is greater than or equal to 1. As shown in FIGS. 5 to 7, when the on-board charging/discharging system 1 is operated in the first mode, the high-voltage battery 8 is charged by the bidirectional converter 2 and the low-voltage converter 3 is disabled.

In the first mode, the on/off states of the upper switch S1 and the lower switch S2 of the first bridge arm are complementary, and the upper switch S3 and the lower switch S4 of the second bridge arm are complementary. The on/off states of the upper switch S1 of the first bridge arm and the lower switch S4 of the second bridge arm are identical. The on/off states of the lower switch S2 of the first bridge arm and the upper switch S3 of the second bridge arm are identical. Moreover, the second bridge circuit 22 performs a diode rectifying operation (i.e., an asynchronous rectifying operation) or a synchronous rectifying operation.

When the on-board charging/discharging system 1 is in the first mode and the output gain of the bidirectional converter 2 is lower than 1, the on/off states of the upper switch S5 and the lower switch S6 of the third bridge arm are complementary, the on/off states of the upper switch S7 and the lower switch S8 of the fourth bridge arm are complementary, and the upper switch S5 and the lower switch S6 of the third bridge arm and the upper switch S7 and the lower switch S8 of the fourth bridge arm perform the synchronous rectifying operation (see FIG. 6). That is, the on/off states of the upper switch S5 and the lower switch S6 of the third bridge arm and the on/off states of the upper switch S7 and the lower switch S8 of the fourth bridge arm are switched at the zero-crossing point of the resonant current Ip or at a time that the zero-crossing point of the resonant current Ip is delayed for a short delaying time (not shown).

Moreover, when the on-board charging/discharging system 1 is in the first mode and the output gain of the bidirectional converter 2 is greater than or equal to 1, the on/off states of the lower switch S6 of the third bridge arm and the lower switch S8 of the fourth bridge arm are complementary. The on/off states of the lower switch S6 of the third bridge arm and the lower switch S8 of the fourth bridge arm are switched at a time that the zero-crossing point of the resonant current Ip is delayed for a phase-shift time period (e.g., the time interval between the time point t1 and the time point t2 as shown in FIG. 7). Moreover, the upper switch S5 of the third bridge arm and the upper switch S7 of the fourth bridge arm perform the synchronous rectifying operation. That is, the upper switch S5 of the third bridge arm is turned on at the time when the node voltage VC of the third bridge arm is in the high level state, and the upper switch S7 of the fourth bridge arm is turned on at the time when the node voltage VD of the fourth bridge arm is in the high level state (see FIG. 7).

Figure 8:
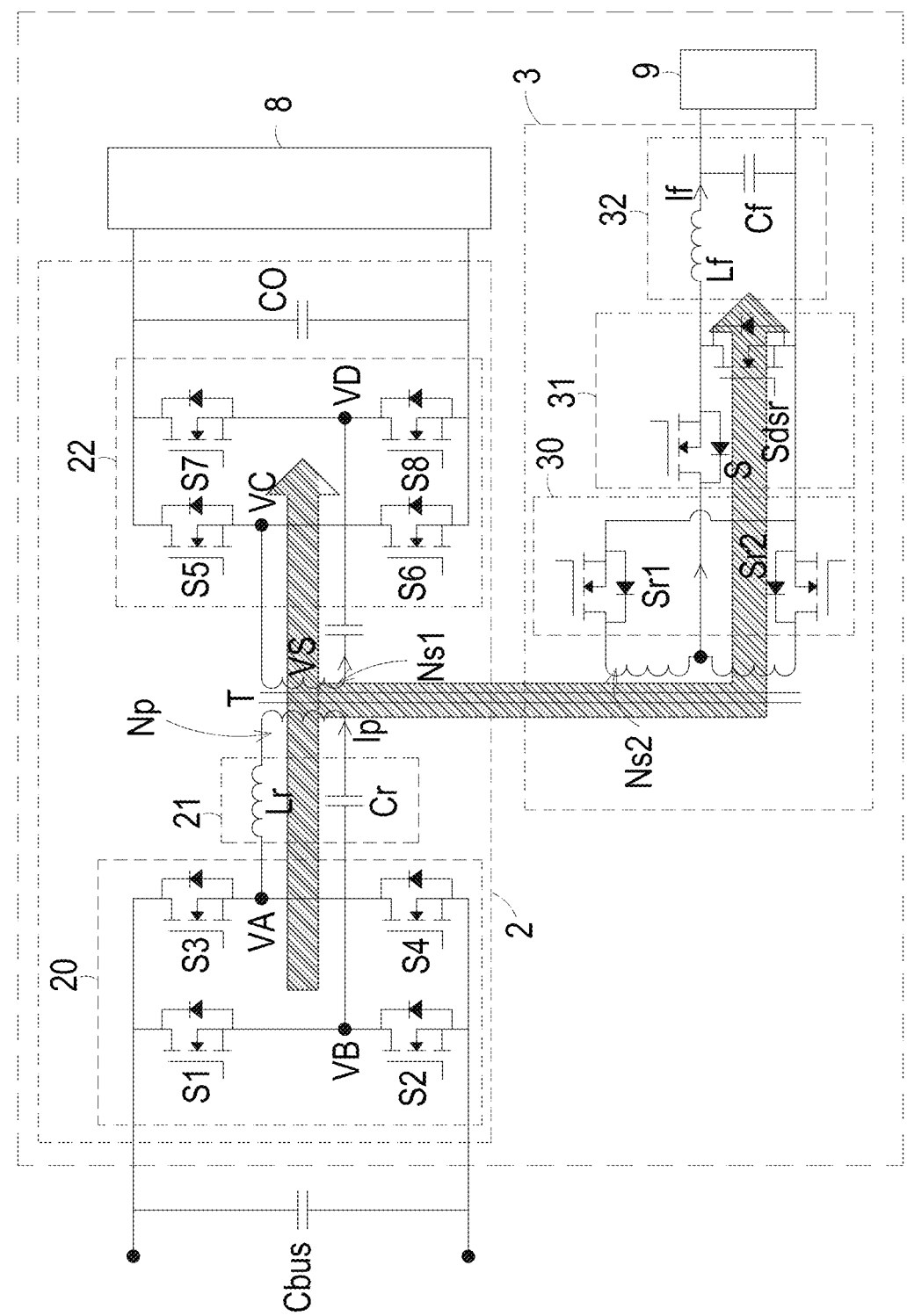
FIG. 8 is a schematic circuit diagram illustrating the path of transferring the electric energy when the on-board charging/discharging system of FIG. 4 is in a second mode.
Figure 9:
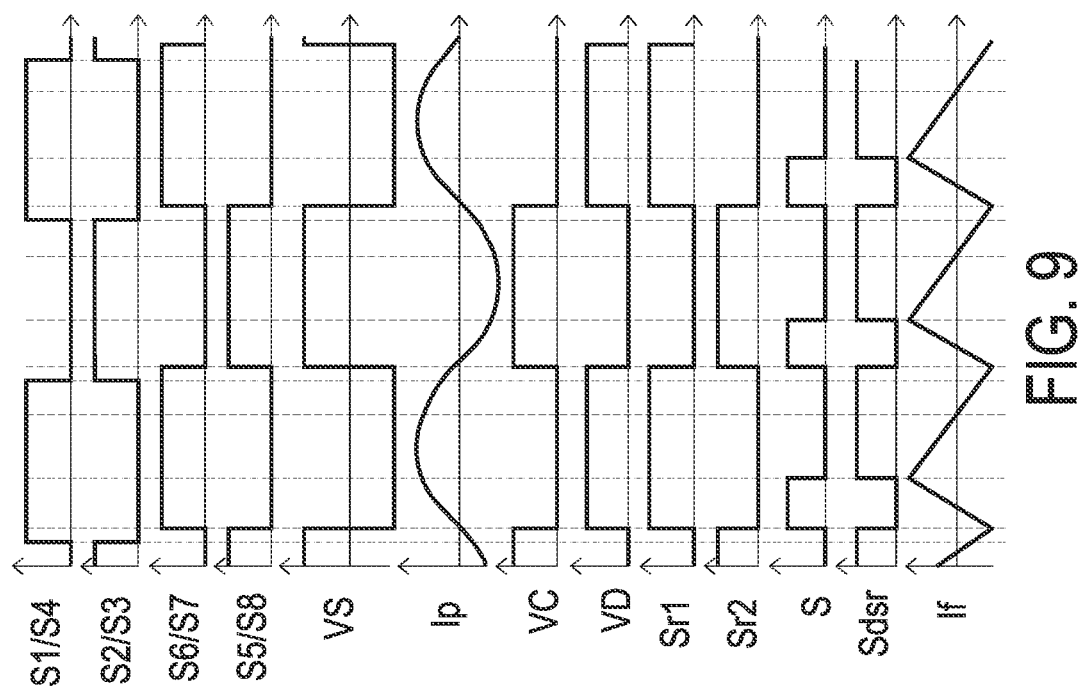
FIG. 9 is a schematic timing waveform diagram illustrating associated voltages and currents when the on-board charging/discharging system of FIG. 8 is in the second mode and the output gain of the bidirectional converter is lower than 1.
Figure 10:
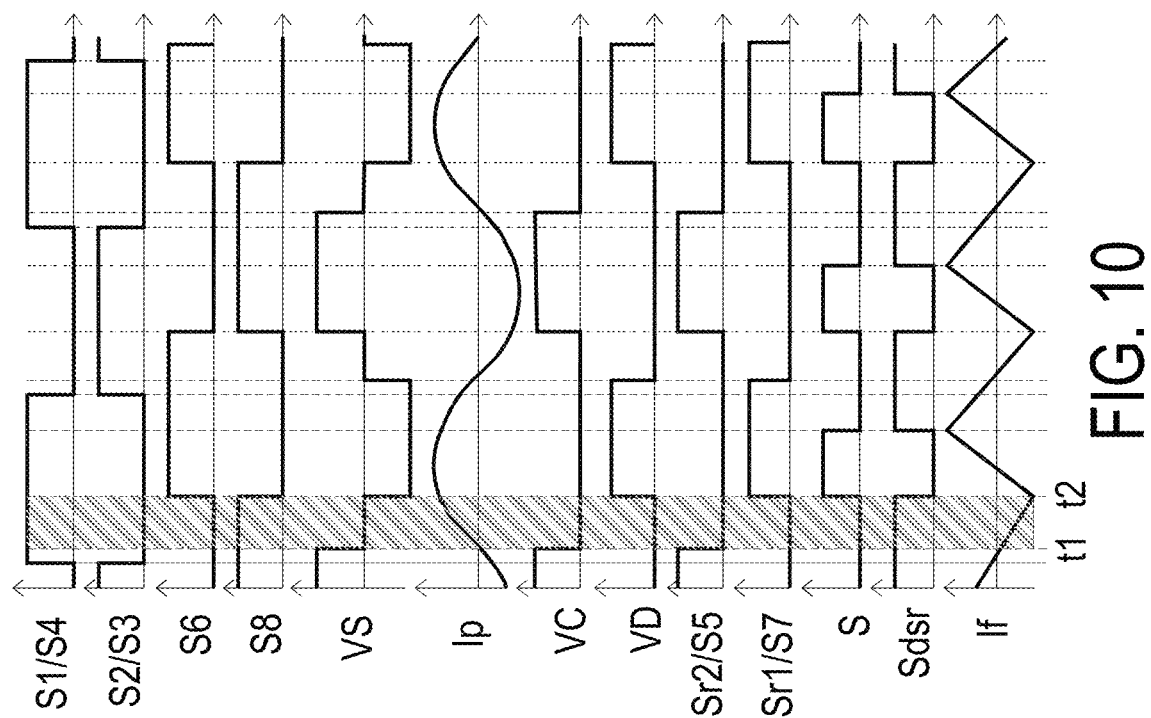
FIG. 10 is a schematic timing waveform diagram illustrating associated voltages and currents when the on-board charging/discharging system of FIG. 8 is in the second mode and the output gain of the bidirectional converter is greater than or equal to 1.

FIG. 8 is a schematic circuit diagram illustrating the path of transferring the electric energy when the on-board charging/discharging system of FIG. 4 is in a second mode. FIG. 9 is a schematic timing waveform diagram illustrating associated voltages and currents when the on-board charging/discharging system of FIG. 8 is in the second mode and the output gain of the bidirectional converter is lower than 1. FIG. 10 is a schematic timing waveform diagram illustrating associated voltages and currents when the on-board charging/discharging system of FIG. 8 is in the second mode and the output gain of the bidirectional converter is greater than or equal to 1. As shown in FIGS. 8 to 10, when the on-board charging/discharging system 1 is in the second mode, the high-voltage battery 8 is charged by the bidirectional converter 2 and the low-voltage converter 3 is enabled.

The operation of the bidirectional converter 2 in the second mode is identical to the operation of the bidirectional converter 2 in the first mode. The waveforms of the associated voltages and currents about the bidirectional converter 2 and shown in FIGS. 9 and 10 are identical to those of the bidirectional converter 2 in the first mode, and are not redundantly described herein. When the on-board charging/discharging system 1 is operated in the second mode, the timing of switching the first switch S to the on state is synchronous with the timing of switching the lower switch S6 of the third bridge arm, the upper switch S7 of the fourth bridge arm and the first rectifying switch Sr1 to the on states and is synchronous with the timing of switching the upper switch S5 of the third bridge arm, the lower switch S8 of the fourth bridge arm and the second rectifying switch Sr2 to the on states. The timing of switching the first switch S to the off state is determined according to a demand of the low-voltage battery 9.

Figure 11:
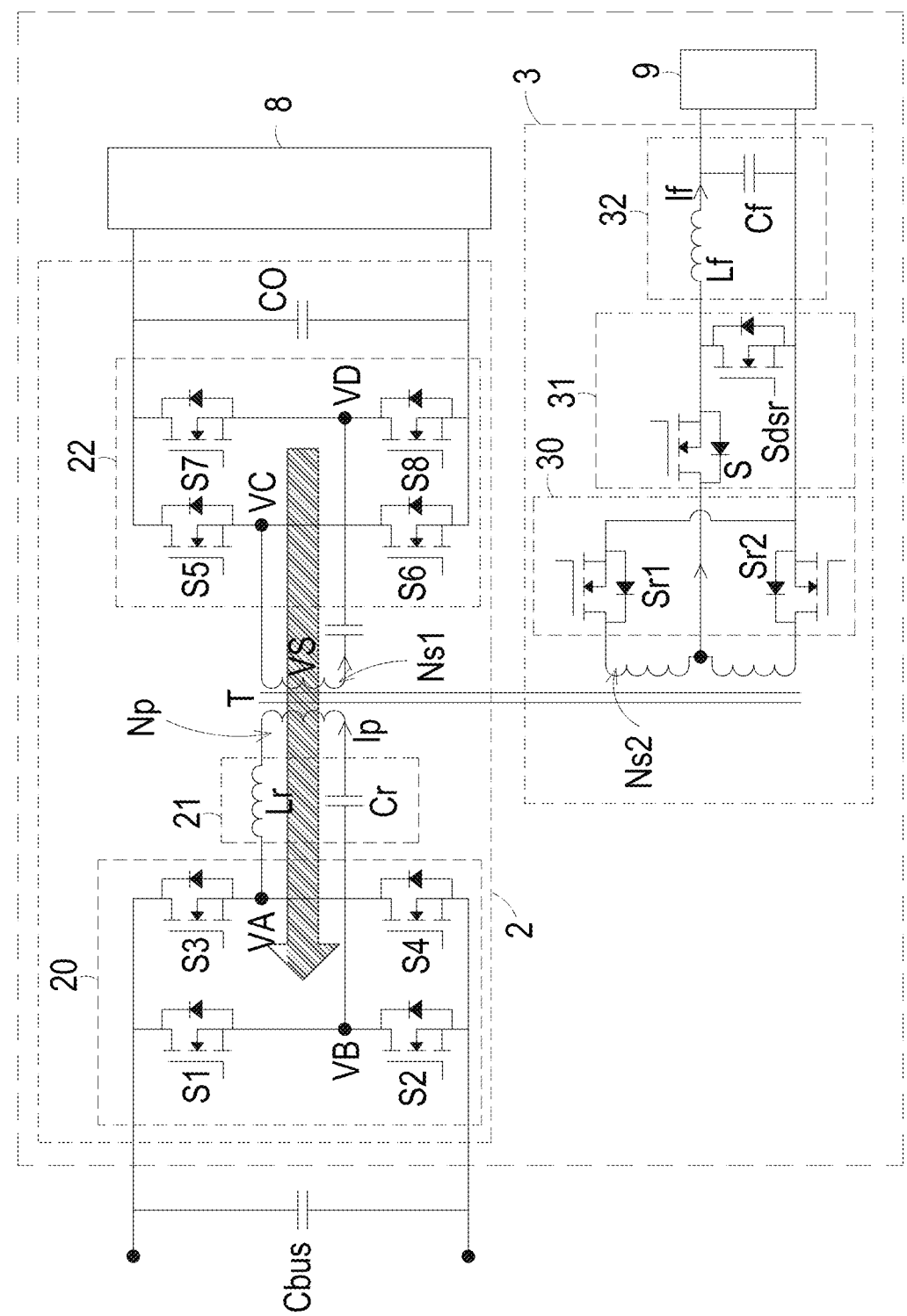
FIG. 11 is a schematic circuit diagram illustrating the path of transferring the electric energy when the on-board charging/discharging system of FIG. 4 is in a third mode.
Figure 12:
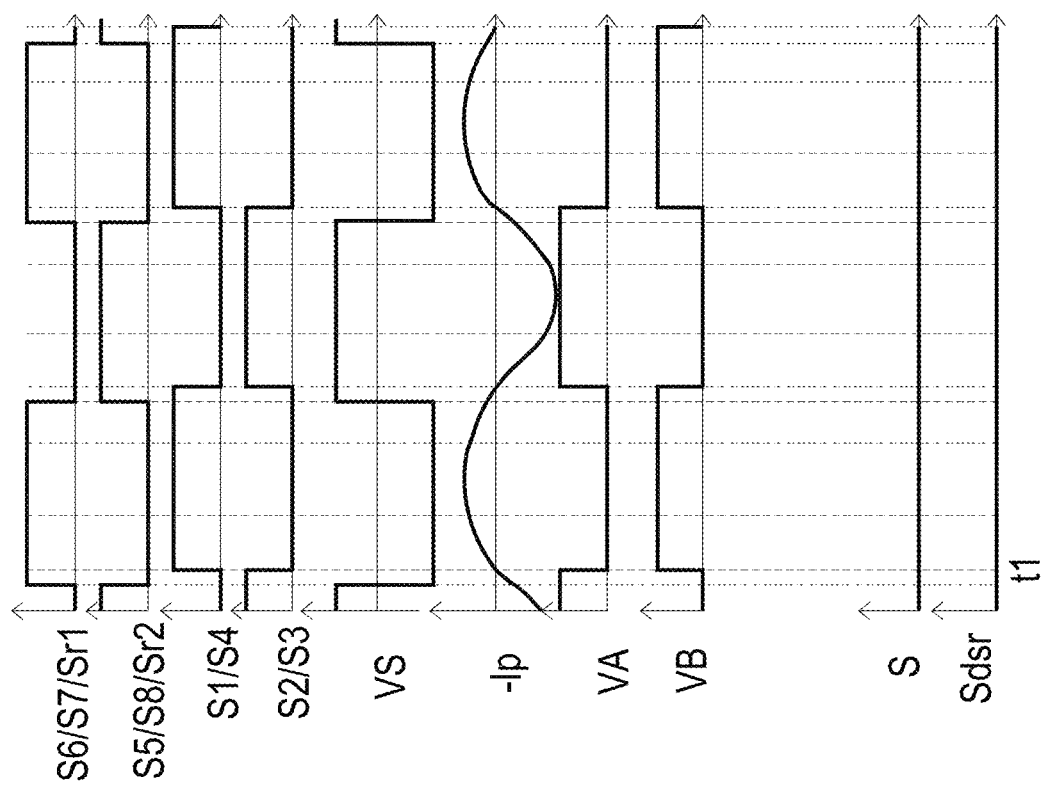
FIG. 12 is a schematic timing waveform diagram illustrating associated voltages and currents when the on-board charging/discharging system of FIG. 11 is in the third mode and the output gain of the bidirectional converter is lower than 1.
Figure 13:
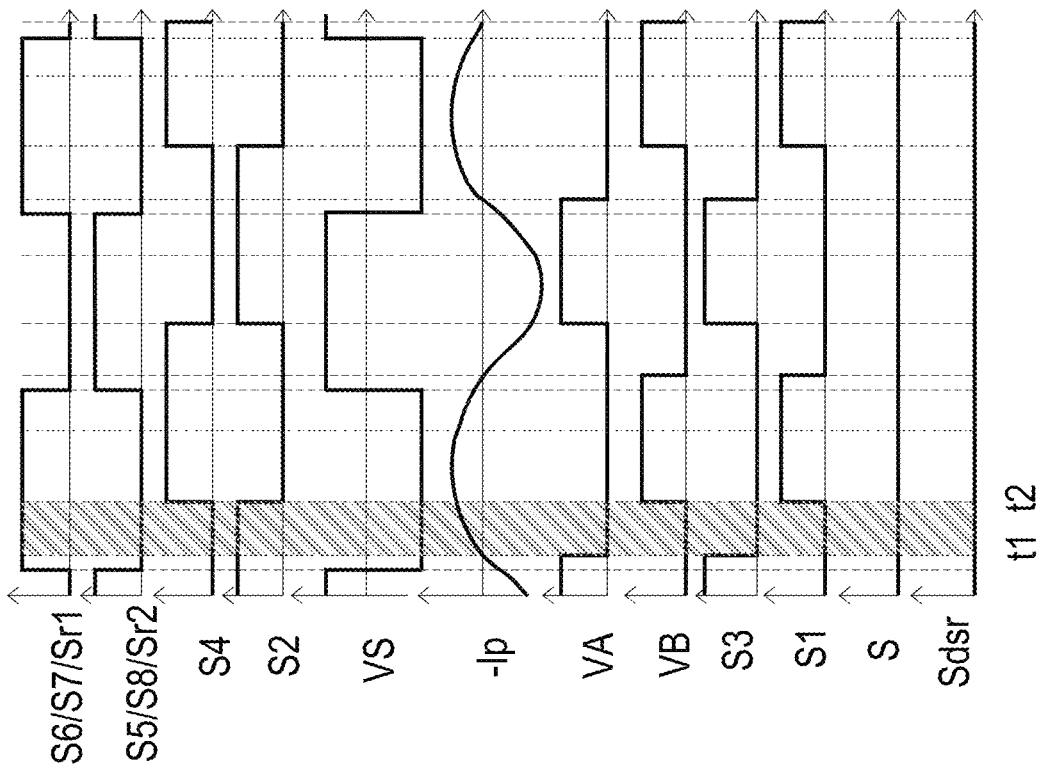
FIG. 13 is a schematic timing waveform diagram illustrating associated voltages and currents when the on-board charging/discharging system of FIG. 11 is in the third mode and the output gain of the bidirectional converter is greater than or equal to 1.

FIG. 11 is a schematic circuit diagram illustrating the path of transferring the electric energy when the on-board charging/discharging system of FIG. 4 is in a third mode. FIG. 12 is a schematic timing waveform diagram illustrating associated voltages and currents when the on-board charging/discharging system of FIG. 11 is in the third mode and the output gain of the bidirectional converter is lower than 1. FIG. 13 is a schematic timing waveform diagram illustrating associated voltages and currents when the on-board charging/discharging system of FIG. 11 is in the third mode and the output gain of the bidirectional converter is greater than or equal to 1. As shown in FIGS. 11 to 13, when the on-board charging/discharging system 1 is operated in the third mode, the high-voltage battery 8 is discharged by the bidirectional converter 2 and the low-voltage converter 3 is disabled.

When the on-board charging/discharging system 1 is operated in the third mode and the output gain of the bidirectional converter 2 is lower than 1, the upper switch S1 and the lower switch S2 of the first bridge arm and the upper switch S3 and the lower switch S4 of the second bridge arm perform the synchronous rectifying operation. That is, the on/off states of the upper switch S1, the lower switch S2, the upper switch S3 and the lower switch S4 are switched at the zero-crossing point of the resonant current Ip (e.g., the time point t1 as shown in FIG. 12) or at a time that the zero-crossing point of the resonant current Ip is delayed for a short delaying time (not shown).

When the on-board charging/discharging system 1 is operated in the third mode and the output gain of the bidirectional converter 2 is greater than or equal to 1, the on/off states of the lower switch S2 of the first bridge arm and the lower switch S4 of the second bridge arm are switched at a time that the zero-crossing point of the resonant current Ip is delayed for a phase-shift time period (e.g., the time interval between the time point t1 and the time point t2 as shown in FIG. 13). Moreover, the upper switch S1 of the first bridge arm and the upper switch S3 of the second bridge arm perform the synchronous rectifying operation. That is, the upper switch S1 of the first bridge arm is turned on at the time when the node voltage VB of the first bridge arm is in the high level state, and the upper switch S3 of the second bridge arm is turned on at the time when the node voltage VA of the second bridge arm is in the high level state. The phase-shift time period is determined according to the input voltage and the output voltage of the bidirectional converter 2.

Moreover, when the on-board charging/discharging system 1 is operated in the third mode, the third bridge arm and the fourth bridge arm of the second bridge circuit 22 of the bidirectional converter 2 are operated in a variable-frequency mode. That is, the frequencies of the upper switch S5 and the lower switch S6 of the third bridge arm and the frequencies of the upper switch S7 and the lower switch S8 of the fourth bridge arm are variable. Moreover, when the on-board charging/discharging system 1 is operated in the third mode and the output gain of the bidirectional converter 2 is greater than or equal to 1, the on/off states of the lower switch S2 of the first bridge arm and the lower switch S4 of the second bridge arm are complementary.

Figure 14:
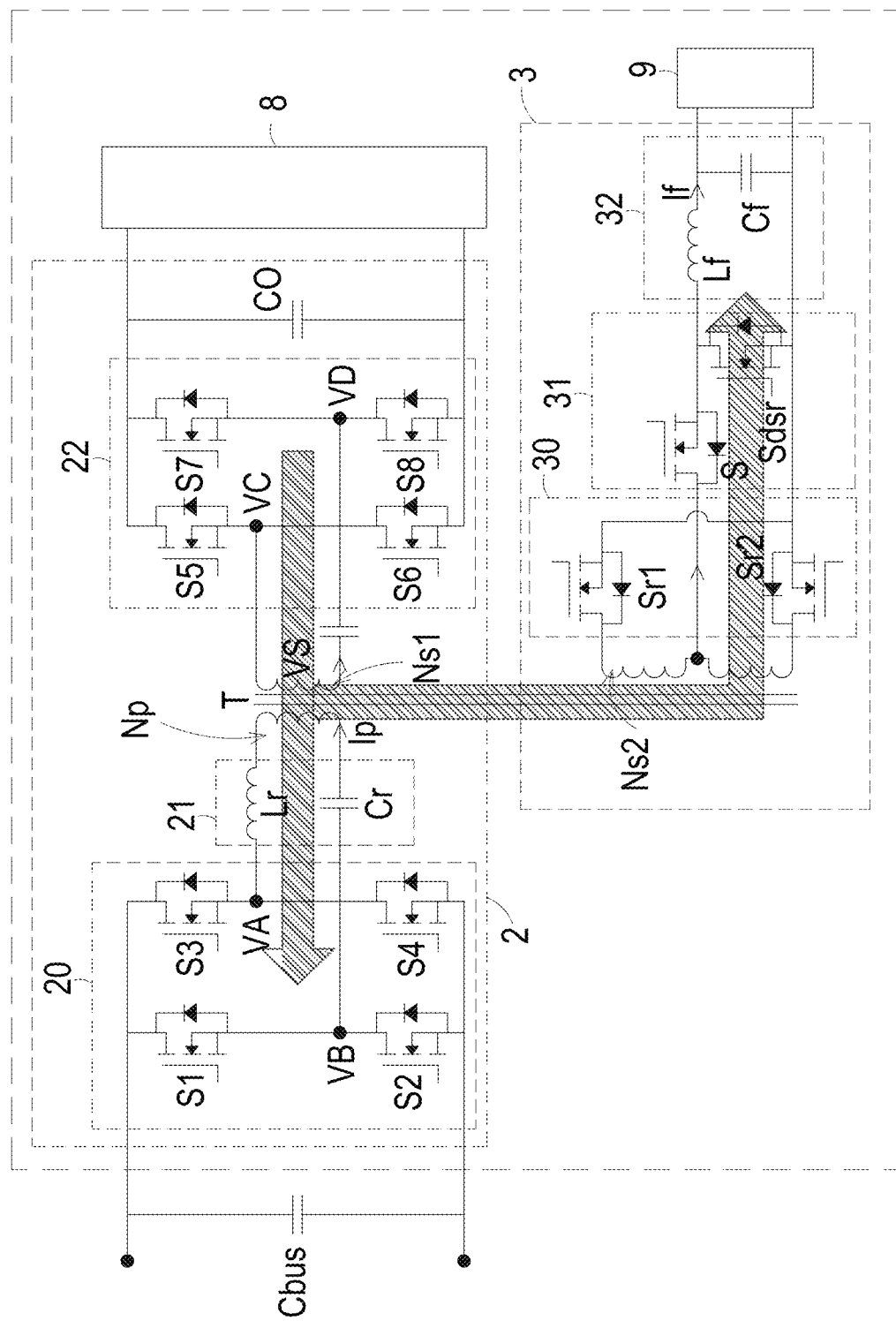
FIG. 14 is a schematic circuit diagram illustrating the path of transferring the electric energy when the on-board charging/discharging system of FIG. 4 is in a fourth mode.
Figure 15:
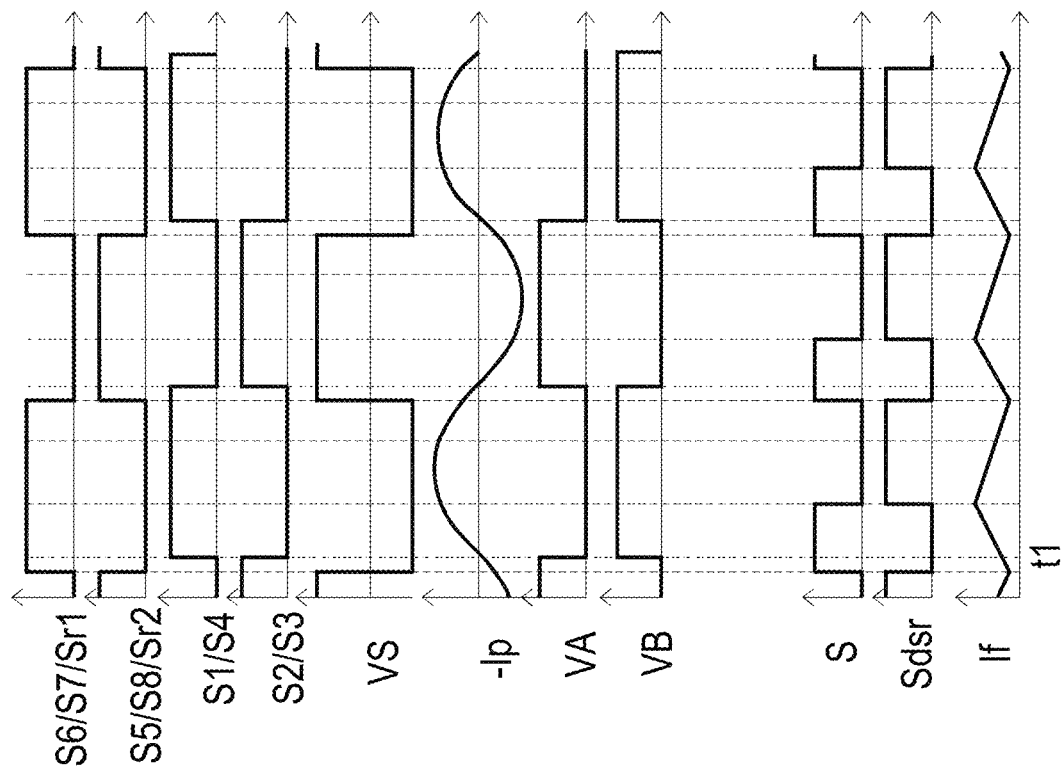
FIG. 15 is a schematic timing waveform diagram illustrating associated voltages and currents when the on-board charging/discharging system of FIG. 14 is in the fourth mode and the output gain of the bidirectional converter is lower than 1.
Figure 16:
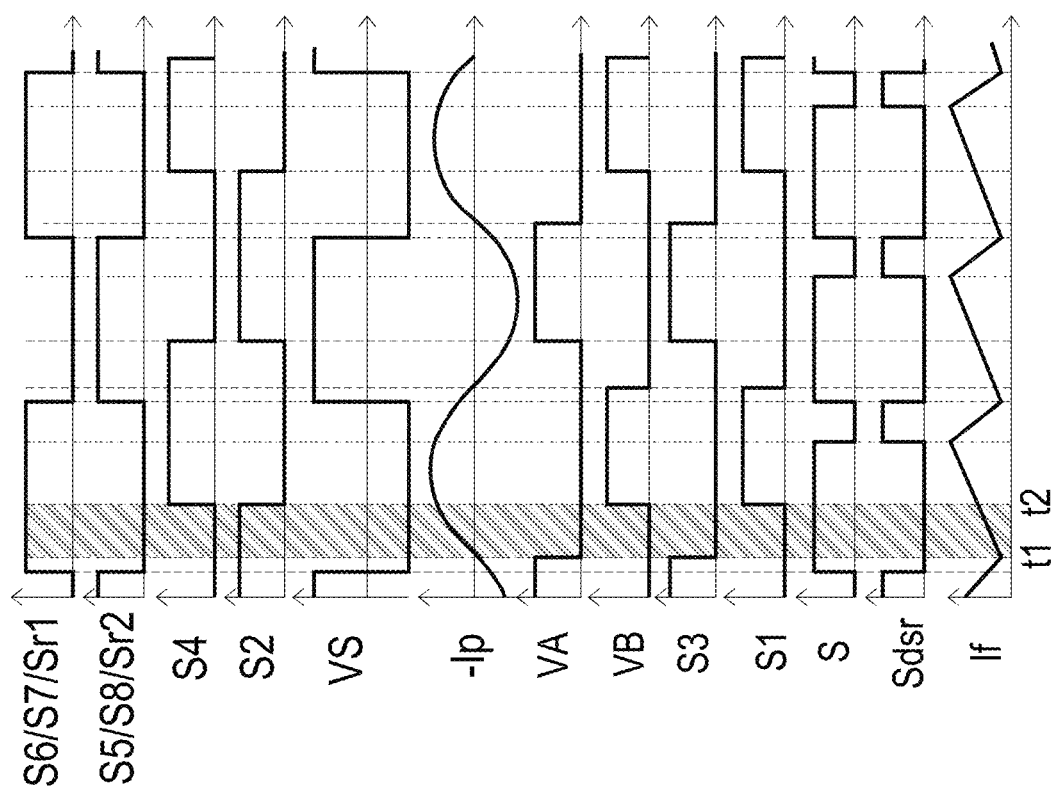
FIG. 16 is a schematic timing waveform diagram illustrating associated voltages and currents when the on-board charging/discharging system of FIG. 14 is in the fourth mode and the output gain of the bidirectional converter is greater than or equal to 1.

FIG. 14 is a schematic circuit diagram illustrating the path of transferring the electric energy when the on-board charging/discharging system of FIG. 4 is in a fourth mode. FIG. 15 is a schematic timing waveform diagram illustrating associated voltages and currents when the on-board charging/discharging system of FIG. 14 is in the fourth mode and the output gain of the bidirectional converter is lower than 1. FIG. 16 is a schematic timing waveform diagram illustrating associated voltages and currents when the on-board charging/discharging system of FIG. 14 is in the fourth mode and the output gain of the bidirectional converter is greater than or equal to 1. As shown in FIGS. 14 to 16, when the on-board charging/discharging system 1 is operated in the fourth mode, the high-voltage battery 8 is discharged by the bidirectional converter 2 and the low-voltage converter 3 is enabled.

The operation of the bidirectional converter 2 in the fourth mode is identical to the operation of the bidirectional converter 2 in the third mode. The waveforms of the associated voltages and currents about the bidirectional converter 2 and shown in FIGS. 15 and 16 are identical to those of the bidirectional converter 2 in the third mode, and are not redundantly described herein. When the on-board charging/discharging system 1 is operated in the fourth mode, the timing of switching the first switch S to the on state is synchronous with the timing of switching the lower switch S6 of the third bridge arm, the upper switch S7 of the fourth bridge arm and the first rectifying switch Sr1 to the on states and is synchronous with the timing of switching the upper switch S5 of the third bridge arm, the lower switch S8 of the fourth bridge arm and the second rectifying switch Sr2 to the on states. Moreover, the timing of switching the first switch S to the off state is determined according to a demand of the low-voltage battery 9.

Figure 17:
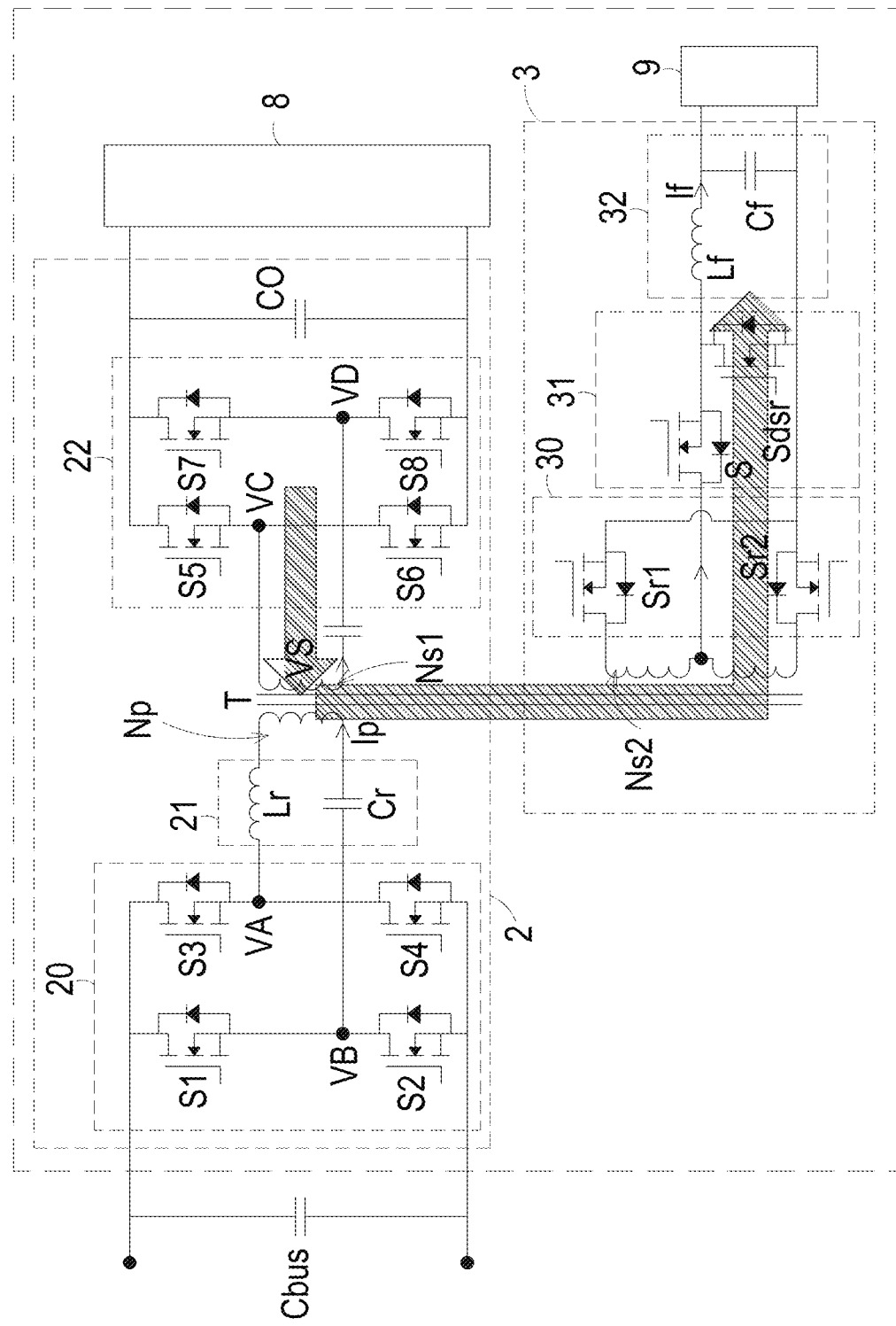
FIG. 17 is a schematic circuit diagram illustrating the path of transferring the electric energy when the on-board charging/discharging system of FIG. 4 is in a fifth mode.
Figure 18:
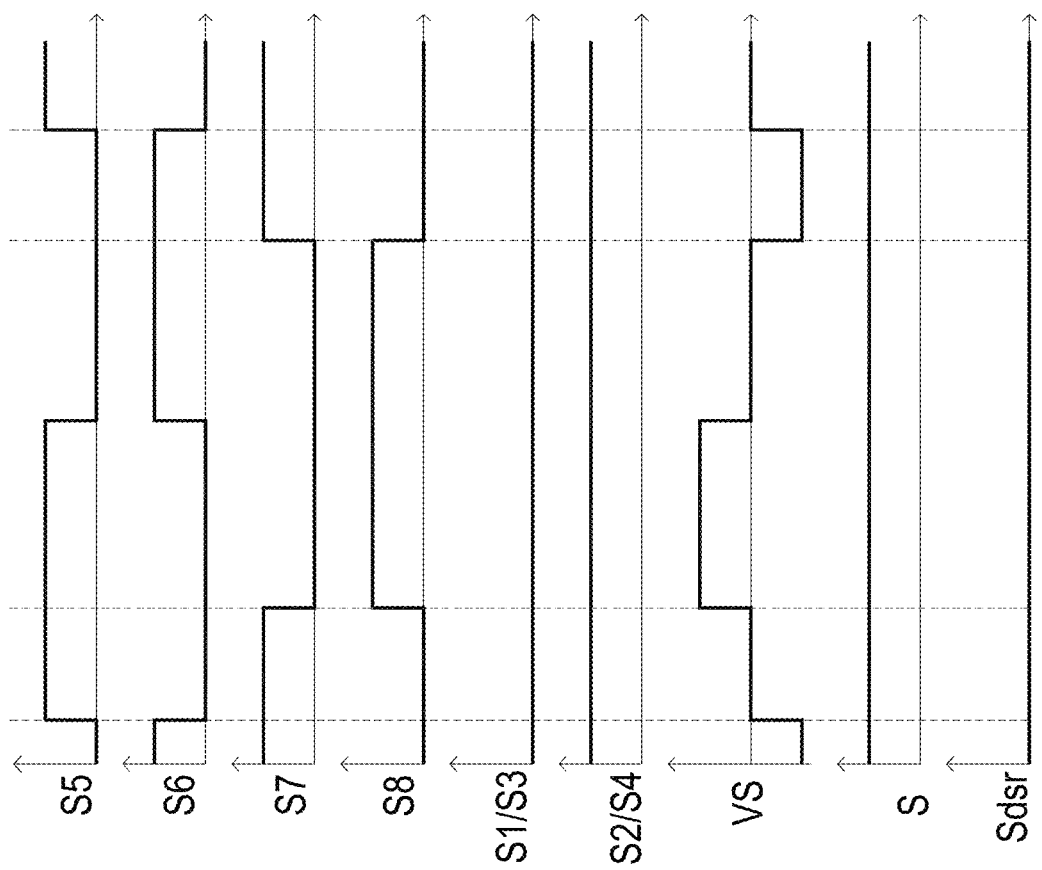
FIG. 18 is a schematic timing waveform diagram illustrating associated voltages and currents when the on-board charging/discharging system of FIG. 17 is in the fifth mode and is controlled in a first control manner.
Figure 19:
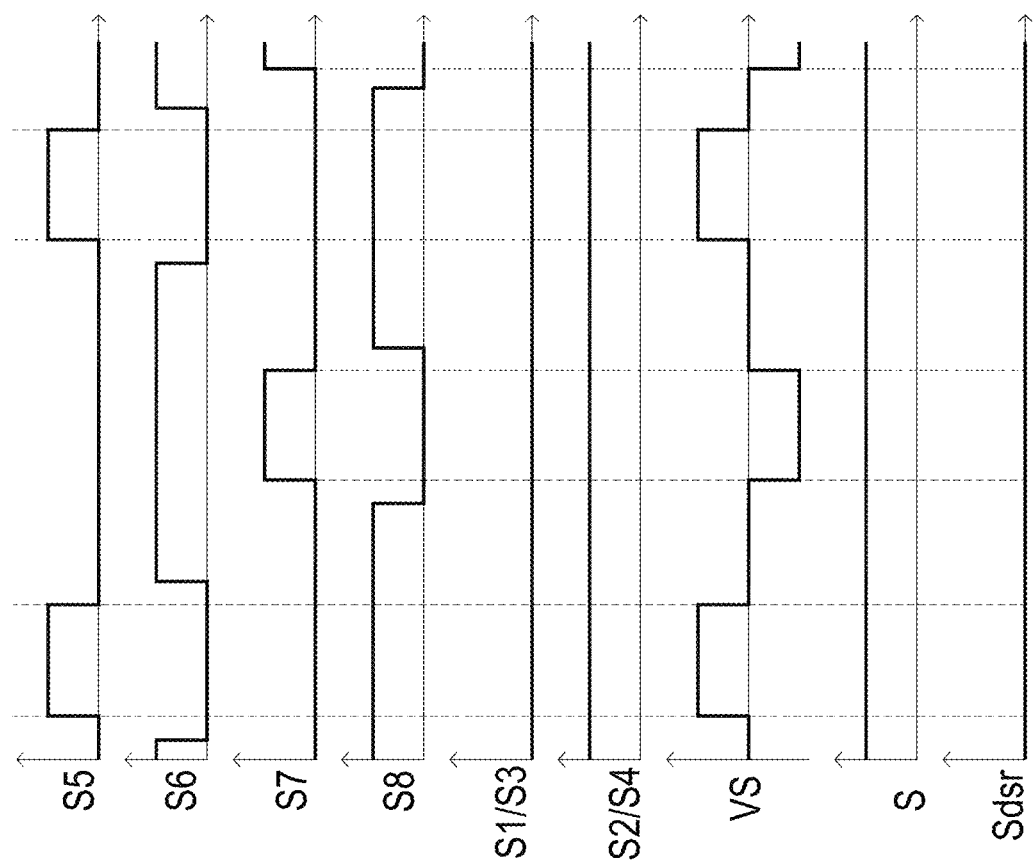
FIG. 19 is a schematic timing waveform diagram illustrating associated voltages and currents when the on-board charging/discharging system of FIG. 17 is in the fifth mode and is controlled in a second control manner.
Figure 20:
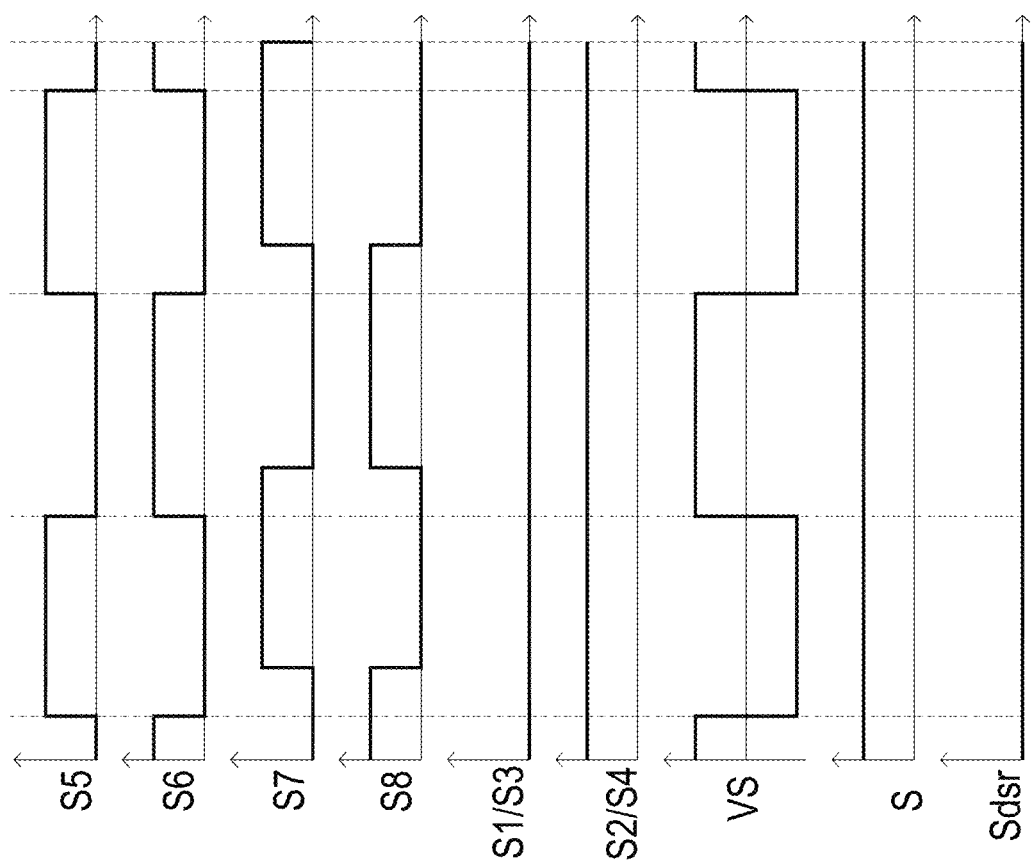
FIG. 20 is a schematic timing waveform diagram illustrating associated voltages and currents when the on-board charging/discharging system of FIG. 17 is in the fifth mode and is controlled in a third control manner.

FIG. 17 is a schematic circuit diagram illustrating the path of transferring the electric energy when the on-board charging/discharging system of FIG. 4 is in a fifth mode. FIG. 18 is a schematic timing waveform diagram illustrating associated voltages and currents when the on-board charging/discharging system of FIG. 17 is in the fifth mode and is controlled in a first control manner. FIG. 19 is a schematic timing waveform diagram illustrating associated voltages and currents when the on-board charging/discharging system of FIG. 17 is in the fifth mode and is controlled in a second control manner. FIG. 20 is a schematic timing waveform diagram illustrating associated voltages and currents when the on-board charging/discharging system of FIG. 17 is in the fifth mode and is controlled in a third control manner. As shown in FIGS. 17 to 20, when the on-board charging/discharging system 1 is operated in the fifth mode, the low-voltage converter 3 is operated.

The low-voltage converter 3 receives the electric energy from the high-voltage battery 8 through the second bridge circuit 22 and the second winding assembly Ns1 and the third winding assembly Ns2 of the transformer T. After the electric energy from the high-voltage battery 8 is converted into a regulated voltage by the low-voltage converter 3, the regulated voltage is provided to the low-voltage battery 9. Moreover, when the on-board charging/discharging system 1 is operated in the fifth mode, the resonant circuit 21 may charge the bus capacitor Cubs continuously and the voltage of the bus capacitor Cubs may be greater than the withstand voltage of the bus capacitor Cubs to damage the bus capacitor Cubs. For solving these drawbacks, the operations of the first bridge arm and the second bridge arm are controlled in one of three control manners to make short-circuit between the neutral-point of the first bridge arm and the neutral-point of the second bridge arm and allow the switching frequencies of the third bridge arm and the fourth bridge arm to be greater than the resonant frequency of the resonant circuit.

In this embodiment, the upper switch S1 of the first bridge arm and the upper switch S3 of the second bridge arm are controlled to be normally on, the lower switch S2 of the first bridge arm and the lower switch S4 of the second bridge arm are controlled to be normally on, or the upper switch S1 and the lower switch S2 of the first bridge arm and the upper switch S3 and the lower switch S4 of the second bridge arm are controlled to be normally on so as to make the short-circuit between the neutral-point of the first bridge arm and the neutral-point of the second bridge arm. In the following descriptions and FIGS. 18 to 20, the lower switch S2 of the first bridge arm and the lower switch S4 of the second bridge arm being normally on are used as an exemplary description.

As shown in FIG. 18, when the on-board charging/discharging system 1 is operated in the fifth mode and is controlled in the first control manner, the lower switch S2 of the first bridge arm and the lower switch S4 of the second bridge arm are controlled to be normally on, the upper switch S1 of the first bridge arm and the upper switch S3 of the second bridge arm are controlled to be normally off, and the upper switch S5 and the lower switch S6 of the third bridge arm and the upper switch S7 and the lower switch S8 of the fourth bridge arm are in phase-shift control.

As shown in FIG. 19, when the on-board charging/discharging system 1 is operated in the fifth mode and is controlled in the second control manner, the lower switch S2 of the first bridge arm and the lower switch S4 of the second bridge arm are controlled to be normally on, the upper switch S1 of the first bridge arm and the upper switch S3 of the second bridge arm are controlled to be normally off, the on/off states of the upper switch S5 and the lower switch S6 of the third bridge arm are complementary, and the on/off states of the upper switch S7 and the lower switch S8 of the fourth bridge arm are complementary. One of the upper switch S5 of the third bridge arm and the upper switch S7 of the fourth bridge arm is on state when the difference of the bridge voltage VCD between the node voltage VC of the third bridge arm and the node voltage VD of the fourth bridge arm is not zero. In an embodiment, as the on/off states of two switches are complementary, there is a dead time formed between the period from the on state of one switch to the on state of the other switch.

As shown in FIG. 20, when the on-board charging/discharging system 1 is operated in the fifth mode and is controlled in the third control manner, the lower switch S2 of the first bridge arm and the lower switch S4 of the second bridge arm are controlled to be normally on, the upper switch S1 of the first bridge arm and the upper switch S3 of the second bridge arm are controlled to be normally off, and the upper switch S5 and the lower switch S6 of the third bridge arm and the upper switch S7 and the lower switch S8 of the fourth bridge arm are in variable-frequency control.

In some embodiments, the zero-crossing point of the resonant current Ip is directly obtained after the resonant current Ip flowing through the resonant circuit 21 is detected, but not limited thereto. In some other embodiments, the zero-crossing point of the resonant current Ip is indirectly obtained according to the falling edge of the waveform of the node voltage VB of the first bridge arm, the falling edge of the waveform of the node voltage VA of the second bridge arm, the falling edge of the waveform of the node voltage VC of the third bridge arm and the falling edge of the waveform of the node voltage VD of the fourth bridge arm.

FIG. 21 is a flowchart illustrating a control method for on-board charging/discharging system of FIG. 4 according to the embodiment of the present invention. As shown in FIG. 21, firstly, in a step S10, the on-board charging/discharging system 1 is operated in one of a first mode, a second mode, a third mode, a fourth mode and a fifth mode. Then, a step S20 is performed.

When the on-board charging/discharging system 1 is operated in the first mode, the high-voltage battery 8 is charged by the bidirectional converter 2 and the low-voltage converter 3 is disabled. When the on-board charging/discharging system 1 is operated in the second mode, the high-voltage battery 8 is charged by the bidirectional converter 2 and the low-voltage converter 3 is enabled. When the on-board charging/discharging system 1 is operated in the third mode, the high-voltage battery 8 is discharged by the bidirectional converter 2 and the low-voltage converter 3 is disabled.

When the on-board charging/discharging system 1 is operated in the third mode and the output gain of the bidirectional converter 2 is lower than 1, the upper switch S1 and the lower switch S2 of the first bridge arm and the upper switch S3 and the lower switch S4 of the second bridge arm perform the synchronous rectifying operation. When the on-board charging/discharging system 1 is operated in the third mode and the output gain of the bidirectional converter 2 is greater than or equal to 1, the on/off states of the lower switch S2 of the first bridge arm and the lower switch S4 of the second bridge arm are complementary, the on/off states of the lower switch S2 of the first bridge arm and the lower switch S4 of the second bridge arm are switched at a time the zero-crossing point of the resonant current Ip is delayed for a phase-shift time period, and the upper switch S1 of the first bridge arm and the upper switch S3 of the second bridge arm perform the synchronous rectifying operation.

When the on-board charging/discharging system 1 is operated in the fourth mode, the high-voltage battery 8 is discharged by the bidirectional converter 2 and the low-voltage converter 3 is enabled. The operation of the bidirectional converter 2 in the fourth mode is identical to the operation of the bidirectional converter 2 in the third mode. When the on-board charging/discharging system 1 is operated in the fourth mode, the timing of switching the first switch S to the on state is synchronous with the timing of switching the lower switch S6 of the third bridge arm, the upper switch S7 of the fourth bridge arm and the first rectifying switch Sr1 to the on states and is synchronous with the timing of switching the upper switch S5 of the third bridge arm, the lower switch S8 of the fourth bridge arm and the second rectifying switch Sr2 to the on states. Moreover, the timing of switching the first switch S to the off state is determined according to a demand of the low-voltage battery 9.

When the on-board charging/discharging system 1 is operated in the fifth mode, the low-voltage converter 3 is operated and the high battery 8 charges the low voltage battery 9. The operations of the first bridge arm and the second bridge arm cause the short-circuit between the neutral-point of the first bridge arm and the neutral-point of the second bridge arm, and the switching frequencies of the third bridge arm and the fourth bridge arm are greater than the resonant frequency of the resonant circuit.

From the above descriptions, the present disclosure provides an on-board charging/discharging system. The on-board charging/discharging system includes a bidirectional converter and a low-voltage converter. When the high-voltage battery is discharged by the bidirectional converter, the bidirectional converter is operated in a variable-frequency mode. For complying with the bidirectional converter, the low-voltage converter is also operated in the variable-frequency mode. Moreover, the on/off states of different switches are controlled according to the output gain of the bidirectional converter. Consequently, the on-board charging/discharging system has optimized volume and reduced cost. Moreover, the soft switching is achieved when the output gain is lower than 1, greater than 1 or equal to 1. Consequently, the efficiency of the on-board charging/discharging system is enhanced. Moreover, while the low-voltage converter is operated in a fixed-frequency mode, the first bridge arm of the bidirectional converter is correspondingly controlled. In such way, the electric energy from the resonant circuit will not continuously charge the bus capacitor. Consequently, the voltage of the bus capacitor can be controlled to be within a reasonable range.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An on-board charging/discharging system, comprising:
a bidirectional converter electrically connected between a bus capacitor and a high-voltage battery and configured to charge or discharge the high-voltage battery, wherein the bidirectional converter comprises:
a first bridge circuit comprising a first bridge arm and a second bridge arm;
a resonant circuit electrically connected with the first bridge circuit;
a transformer comprising a first winding assembly and a second winding assembly, wherein the first winding assembly is electrically connected with the resonant circuit, and the first winding assembly and the second winding assembly magnetically interact with each other; and
a second bridge circuit electrically connected with the second winding assembly through a first capacitor, electrically connected with the high-voltage battery, and comprising a third bridge arm and a fourth bridge arm; and
a low-voltage converter electrically connected with a low-voltage battery, wherein during operation of the low-voltage converter, the received electric energy is converted into a regulated voltage to power the low-voltage battery, wherein the low-voltage converter comprises:
a third winding assembly with a center tap, wherein the third winding assembly magnetically interfaces with the first winding assembly and the second winding assembly;
a synchronous rectifying circuit comprising a first rectifying switch electrically connected with a first terminal of the third winding assembly and a second rectifying switch electrically connected with a second terminal of the third winding assembly; and
a power switching circuit electrically connected between the center tap of the third winding assembly and the low-voltage battery and comprising a first switch and a second switch, wherein the first switch is electrically connected between the center tap of the third winding assembly and the low-voltage battery, the second switch is electrically connected with the first switch and the synchronous rectifying circuit, and on/off states of the first switch and the second switch are complementary,
wherein the on-board charging/discharging system is operated in one of a first mode, a second mode, a third mode, a fourth mode and a fifth mode,
wherein when the on-board charging/discharging system is operated in the first mode, the high-voltage battery is charged by the bidirectional converter and the low-voltage converter is disabled,
wherein when the on-board charging/discharging system is operated in the second mode, the high-voltage battery is charged by the bidirectional converter and the low-voltage converter is enabled,
wherein when the on-board charging/discharging system is operated in the third mode, the high-voltage battery is discharged by the bidirectional converter and the low-voltage converter is disabled, wherein when the on-board charging/discharging system is operated in the third mode and an output gain of the bidirectional converter is lower than 1, an upper switch and a lower switch of the first bridge arm and an upper switch and a lower switch of the second bridge arm perform a synchronous rectifying operation, wherein when the on-board charging/discharging system is operated in the third mode and the output gain of the bidirectional converter is greater than or equal to 1, the on/off states of the lower switch of the first bridge arm and the lower switch of the second bridge arm are switched at a time that a zero-crossing point of a resonant current flowing through the resonant circuit is delayed for a phase-shift time period, and the upper switch of the first bridge arm and the upper switch of the second bridge arm perform the synchronous rectifying operation,
wherein when the on-board charging/discharging system is operated in the fourth mode, the high-voltage battery is discharged by the bidirectional converter and the low-voltage converter is enabled, wherein when the on-board charging/discharging system is operated in the fourth mode and the output gain of the bidirectional converter is lower than 1, the upper switch and the lower switch of the first bridge arm and the upper switch and the lower switch of the second bridge arm perform the synchronous rectifying operation, wherein when the on-board charging/discharging system is operated in the fourth mode and the output gain of the bidirectional converter is greater than or equal to 1, the on/off states of the lower switch of the first bridge arm and the lower switch of the second bridge arm are switched at a time that the zero-crossing point of the resonant current flowing through the resonant circuit is delayed for the phase-shift time period, and the upper switch of the first bridge arm and the upper switch of the second bridge arm perform the synchronous rectifying operation, wherein when the on-board charging/discharging system is operated in the fourth mode, the timing of switching the first switch to the on state is synchronous with the timing of switching a lower switch of the third bridge arm, an upper switch of the fourth bridge arm and the first rectifying switch to the on states and is synchronous with the timing of switching an upper switch of the third bridge arm, a lower switch of the fourth bridge arm and the second rectifying switch to the on states, and the timing of switching the first switch to the off state is determined according to a demand of the low-voltage battery,
wherein when the on-board charging/discharging system is operated in the fifth mode, the low-voltage converter is operated, and the operations of the first bridge arm and the second bridge arm make a short-circuit between a neutral-point of the first bridge arm and a neutral-point of the second bridge arm, and the switching frequencies of the third bridge arm and the fourth bridge arm are greater than a resonant frequency of the resonant circuit.

2. The on-board charging/discharging system according to claim 1, wherein when the on-board charging/discharging system is operated in the first mode, the on/off states of the upper switch and the lower switch of the first bridge arm are complementary, the upper switch and the lower switch of the second bridge arm are complementary, the on/off states of the upper switch of the first bridge arm and the lower switch of the second bridge arm are identical, the on/off states of the lower switch of the first bridge arm and the upper switch of the second bridge arm are identical, and the second bridge circuit performs a diode rectifying operation or the synchronous rectifying operation.

3. The on-board charging/discharging system according to claim 2, wherein when the on-board charging/discharging system is operated in the first mode and the output gain of the bidirectional converter is lower than 1, the on/off states of the upper switch and the lower switch of the third bridge arm are complementary, the on/off states of the upper switch and the lower switch of the fourth bridge arm are complementary, and the upper switch and the lower switch of the third bridge arm and the upper switch and the lower switch of the fourth bridge arm perform the synchronous rectifying operation.

4. The on-board charging/discharging system according to claim 2, wherein when the on-board charging/discharging system is operated in the first mode and the output gain of the bidirectional converter is greater than or equal to 1, the on/off states of the lower switch of the third bridge arm and the lower switch of the fourth bridge arm are complementary, the on/off states of the lower switch of the third bridge arm and the lower switch of the fourth bridge arm are switched at a time that the zero-crossing point of the resonant current is delayed for the phase-shift time period, and the upper switch of the third bridge arm and the upper switch of the fourth bridge arm perform the synchronous rectifying operation.

5. The on-board charging/discharging system according to claim 2, wherein when the on-board charging/discharging system is operated in the second mode, the on/off states of the upper switch and the lower switch of the first bridge arm are complementary, the on/off states of the upper switch and the lower switch of the second bridge arm are complementary, the on/off states of the upper switch of the first bridge arm and the lower switch of the second bridge arm are identical, the on/off states of the lower switch of the first bridge arm and the upper switch of the second bridge arm are identical, and the second bridge circuit performs the diode rectifying operation or the synchronous rectifying operation, wherein when the on-board charging/discharging system is operated in the second mode, the timing of switching the first switch to the on state is synchronous with the timing of switching the lower switch of the third bridge arm, the upper switch of the fourth bridge arm and the first rectifying switch to the on states and is synchronous with the timing of switching the upper switch of the third bridge arm, the lower switch of the fourth bridge arm and the second rectifying switch to the on states, and the timing of switching the first switch to the off state is determined according to a demand of the low-voltage battery.

6. The on-board charging/discharging system according to claim 1, wherein when the on-board charging/discharging system is operated in the fifth mode, the upper switch of the first bridge arm and the upper switch of the second bridge arm are normally on, or the lower switch of the first bridge arm and the lower switch of the second bridge arm are normally on, or the upper switch and the lower switch of the first bridge arm and the upper switch and the lower switch of the second bridge arm are normally on.

7. The on-board charging/discharging system according to claim 6, wherein when the on-board charging/discharging system is operated in the fifth mode, the upper switch and the lower switch of the third bridge arm and the upper switch and lower switch of the fourth bridge arm are controlled in a phase-shift mode.

8. The on-board charging/discharging system according to claim 6, wherein when the on-board charging/discharging system is operated in the fifth mode, the on/off states of the upper switch and the lower switch of the third bridge arm are complementary, the on/off states of the upper switch and the lower switch of the fourth bridge arm are complementary, and one of the upper switch of the third bridge arm and the upper switch of the fourth bridge arm is on state when a difference of a bridge voltage between a neutral-point voltage of the third bridge arm and a neutral-point voltage of the fourth bridge arm is not zero.

9. The on-board charging/discharging system according to claim 7, wherein when the on-board charging/discharging system is operated in the fifth mode, the upper switch and the lower switch of the third bridge arm and the upper switch and lower switch of the fourth bridge arm are controlled in a variable-frequency mode.

10. The on-board charging/discharging system according to claim 1, wherein the zero-crossing point of the resonant current is directly obtained after the resonant current flowing through the resonant circuit is detected.

11. The on-board charging/discharging system according to claim 1, wherein the zero-crossing point of the resonant current is indirectly obtained according to a falling edge of a waveform of a node voltage of the first bridge arm, a falling edge of a waveform of a node voltage of the second bridge arm, a falling edge of a waveform of a node voltage of a third bridge arm and a falling edge of a waveform of a node voltage of the fourth bridge arm.

12. The on-board charging/discharging system according to claim 1, wherein the maximum output power of the bidirectional converter is 6.6 KW, and the maximum output power of the low-voltage converter is 3 KW.

13. A control method for an on-board charging/discharging system, wherein the on-board charging/discharging system comprises a bidirectional converter, a low-voltage converter, a high-voltage battery and a low-voltage battery, the bidirectional converter comprises a first bridge circuit, a second bridge circuit and a resonant circuit, the first bridge circuit comprises a first bridge arm and a second bridge arm, the second bridge circuit comprises a third bridge arm and a fourth bridge arm, and the low-voltage converter comprises a first rectifying switch, a second rectifying switch and a first switch, the control method comprising steps of:

(a) allowing the on-board charging/discharging system to be operated in one of a first mode, a second mode, a third mode, a fourth mode and a fifth mode;

(b) when the on-board charging/discharging system is operated in the first mode, charging the high-voltage battery by the bidirectional converter and disabling the low-voltage converter;

when the on-board charging/discharging system is operated in the second mode, charging the high-voltage battery by the bidirectional converter and enabling the low-voltage converter;

when the on-board charging/discharging system is operated in the third mode, discharging the high-voltage battery by the bidirectional converter and disabling the low-voltage converter, wherein when the on-board charging/discharging system is operated in the third mode and an output gain of the bidirectional converter is lower than 1, an upper switch and a lower switch of the first bridge arm and an upper switch and a lower switch of the second bridge arm perform a synchronous rectifying operation, wherein when the on-board charging/discharging system is operated in the third mode and the output gain of the bidirectional converter is greater than or equal to 1, the on/off states of the lower switch of the first bridge arm and the lower switch of the second bridge arm are switched at a time that a zero-crossing point of resonant current flowing through the resonant circuit is delayed for a phase-shift time period, and the upper switch of the first bridge arm and the upper switch of the second bridge arm perform the synchronous rectifying operation;

when the on-board charging/discharging system is operated in the fourth mode, discharging the high-voltage battery by the bidirectional converter and enabling the low-voltage converter, wherein when the on-board charging/discharging system is operated in the fourth mode and the output gain of the bidirectional converter is lower than 1, the upper switch and the lower switch of the first bridge arm and the upper switch and the lower switch of the second bridge arm perform the synchronous rectifying operation, wherein when the on-board charging/discharging system is operated in the fourth mode and the output gain of the bidirectional converter is greater than or equal to 1, the on/off states of the lower switch of the first bridge arm and the lower switch of the second bridge arm are switched at a time that the zero-crossing point of resonant current flowing through the resonant circuit is delayed for the phase-shift time period, and the upper switch of the first bridge arm and the upper switch of the second bridge arm perform the synchronous rectifying operation, wherein when the on-board charging/discharging system is operated in the fourth mode, the timing of switching the first switch to the on state is synchronous with the timing of switching a lower switch of the third bridge arm, an upper switch of the fourth bridge arm and the first rectifying switch to the on states and is synchronous with the timing of switching an upper switch of the third bridge arm, a lower switch of the fourth bridge arm and the second rectifying switch to the on states, and the timing of switching the first switch to the off state is determined according to a demand of the low-voltage battery;

when the on-board charging/discharging system is operated in the fifth mode, controlling the low-voltage converter to be operated, and the operations of the first bridge arm and the second bridge arm make a short-circuit between a neutral-point of the first bridge arm and a neutral-point of the second bridge arm, and switching frequencies of the third bridge arm and the fourth bridge arm are greater than a resonant frequency of the resonant circuit.

14. The control method according to claim 13, wherein in the step (b), when the on-board charging/discharging system is operated in the first mode, the on/off states of the upper switch and the lower switch of the first bridge arm are complementary, the upper switch and the lower switch of the second bridge arm are complementary, the on/off states of the upper switch of the first bridge arm and the lower switch of the second bridge arm are identical, the on/off states of the lower switch of the first bridge arm and the upper switch of the second bridge arm are identical, and the second bridge circuit performs a diode rectifying operation or the synchronous rectifying operation.

15. The control method according to claim 14, wherein in the step (b), when the on-board charging/discharging system is operated in the first mode and the output gain of the bidirectional converter is lower than 1, the on/off states of the upper switch and the lower switch of the third bridge arm are complementary, the on/off states of the upper switch and the lower switch of the fourth bridge arm are complementary, and the upper switch and the lower switch of the third bridge arm and the upper switch and the lower switch of the fourth bridge arm perform the synchronous rectifying operation.

16. The control method according to claim 14, wherein in the step (b), when the on-board charging/discharging system is operated in the first mode and the output gain of the bidirectional converter is greater than or equal to 1, the on/off states of the lower switch of the third bridge arm and the lower switch of the fourth bridge arm are complementary, the on/off states of the lower switch of the third bridge arm and the lower switch of the fourth bridge arm are switched at a time that the zero-crossing point of the resonant current is delayed for the phase-shift time period, and the upper switch of the third bridge arm and the upper switch of the fourth bridge arm perform the synchronous rectifying operation.

17. The control method according to claim 14, wherein in the step (b), when the on-board charging/discharging system is operated in the second mode, the on/off states of the upper switch and the lower switch of the first bridge arm are complementary, the upper switch and the lower switch of the second bridge arm are complementary, the on/off states of the upper switch of the first bridge arm and the lower switch of the second bridge arm are identical, the on/off states of the lower switch of the first bridge arm and the upper switch of the second bridge arm are identical, and the second bridge circuit performs the diode rectifying operation or the synchronous rectifying operation, wherein when the on-board charging/discharging system is operated in the second mode, the timing of switching the first switch to the on state is synchronous with the timing of switching the lower switch of the third bridge arm, the upper switch of the fourth bridge arm and the first rectifying switch to the on states and is synchronous with the timing of switching the upper switch of the third bridge arm, the lower switch of the fourth bridge arm and the second rectifying switch to the on states, and the timing of switching the first switch to the off state is determined according to a demand of the low-voltage battery.

18. The control method according to claim 13, wherein in the step (b), when the on-board charging/discharging system is in the fifth mode, the upper switch of the first bridge arm and the upper switch of the second bridge arm are normally on, or the lower switch of the first bridge arm and the lower switch of the second bridge arm are normally on, or the upper switch and the lower switch of the first bridge arm and the upper switch and the lower switch of the second bridge arm are normally on.

19. The control method according to claim 18, wherein in the step (b), when the on-board charging/discharging system is operated in the fifth mode, the upper switch and the lower switch of the third bridge arm and the upper switch and lower switch of the fourth bridge arm are controlled in a phase-shift mode.

20. The control method according to claim 18, wherein in the step (b), when the on-board charging/discharging system is operated in the fifth mode, the on/off states of the upper switch and the lower switch of the third bridge arm are complementary, the on/off states of the upper switch and the lower switch of the fourth bridge arm are complementary, and one of the upper switch of the third bridge arm and the upper switch of the fourth bridge arm is on state when a difference of a bridge voltage between a node voltage of the third bridge arm and a node voltage of the fourth bridge arm is not zero.

21. The control method according to claim 18, wherein in the step (b), when the on-board charging/discharging system is operated in the fifth mode, the upper switch and the lower switch of the third bridge arm and the upper switch and lower switch of the fourth bridge arm are controlled in a variable-frequency mode.

* * * * *